United States Patent
Kraus et al.

(10) Patent No.: US 10,446,180 B1
(45) Date of Patent: Oct. 15, 2019

(54) MULTI-ACTUATOR INTERCONNECTOR

(71) Applicant: Seagate Technology LLC, Cupertino, CA (US)

(72) Inventors: Maxwell Reese Kraus, Shakopee, MN (US); Roger A. Resh, Shakopee, MN (US); Andrew R. Motzko, Delano, MN (US); Michael Allen Mewes, Belle Plaine, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/927,758

(22) Filed: Mar. 21, 2018

(51) Int. Cl.
 *G11B 5/55* (2006.01)
 *G11B 5/48* (2006.01)

(52) U.S. Cl.
 CPC .......... *G11B 5/5578* (2013.01); *G11B 5/4813* (2013.01)

(58) Field of Classification Search
 CPC ............................ G11B 5/5578; G11B 5/4813
 See application file for complete search history.

(56) References Cited

U.S. PATENT DOCUMENTS

| | | | |
|---|---|---|---|
| 4,270,154 A * | 5/1981 | Crawford | G11B 5/012 360/137 |
| 4,423,448 A | 12/1983 | Frandsen | |
| 4,544,972 A | 10/1985 | Kogure et al. | |
| 4,891,723 A * | 1/1990 | Zak | G11B 5/4833 360/244.1 |
| 4,937,693 A | 6/1990 | Connolly et al. | |
| 5,081,552 A * | 1/1992 | Glaser | G11B 25/043 360/903 |
| 5,223,993 A * | 6/1993 | Squires | G06F 3/0601 360/246.7 |
| 5,261,058 A | 11/1993 | Squires et al. | |
| 5,274,773 A | 12/1993 | Squires et al. | |
| 5,293,282 A | 3/1994 | Squires et al. | |
| 5,341,351 A | 8/1994 | Ng | |
| 5,343,345 A | 8/1994 | Gilovich | |
| 5,343,347 A * | 8/1994 | Gilovich | G11B 5/4813 360/246.7 |
| 5,355,486 A * | 10/1994 | Cornaby | G11B 19/02 360/77.08 |
| 5,412,666 A | 5/1995 | Squires et al. | |
| 5,454,157 A * | 10/1995 | Ananth | G11B 33/121 29/467 |
| 5,477,401 A | 12/1995 | Squires et al. | |
| 5,523,901 A | 6/1996 | Anderson et al. | |
| 5,610,808 A | 3/1997 | Squires et al. | |

(Continued)

*Primary Examiner* — Brian E Miller
(74) *Attorney, Agent, or Firm* — Faegre Baker Daniels LLP

(57) ABSTRACT

According to some embodiments, a storage device includes a first actuator and a second actuator rotatable around a common axis. The storage device further includes a first electrical connector configured to communicate electrical signals to and from the first actuator, and a second electrical connector configured to communicate electrical signals to and from the second actuator and to communicate electrical signals to and from the first electrical connector. The storage device includes a hermetically-sealed body, the hermetically-sealed body including a base deck and a top cover, wherein the second electrical connector is configured to send and receive electrical signals to and from the first actuator and the second actuator through a single aperture in the hermetically-sealed body.

20 Claims, 25 Drawing Sheets

(56) References Cited

U.S. PATENT DOCUMENTS

| | | | |
|---|---|---|---|
| 5,761,007 A * | 6/1998 | Price | G11B 5/4813 360/264.4 |
| 5,805,386 A | 9/1998 | Faris | |
| 5,963,399 A * | 10/1999 | Briggs | G11B 5/4846 360/266.3 |
| 5,970,602 A * | 10/1999 | Harada | G11B 5/484 29/603.06 |
| 5,983,485 A | 11/1999 | Misso | |
| 6,005,743 A | 12/1999 | Price et al. | |
| 6,005,747 A * | 12/1999 | Gilovich | G11B 5/54 360/98.07 |
| 6,057,990 A * | 5/2000 | Gilovich | G11B 5/4893 360/246.7 |
| 6,121,742 A * | 9/2000 | Misso | G11B 5/4886 318/562 |
| 6,344,938 B1 | 2/2002 | Smith | |
| 6,384,998 B1 | 5/2002 | Price et al. | |
| 6,433,957 B1 * | 8/2002 | Rudd | G11B 33/1446 360/97.16 |
| 6,449,130 B1 | 9/2002 | Koyama | |
| 6,490,138 B1 | 12/2002 | Prater | |
| 6,493,172 B1 * | 12/2002 | Morris | G11B 5/5552 360/77.02 |
| 6,493,176 B1 * | 12/2002 | Deng | G11B 5/5552 360/48 |
| 6,519,109 B1 * | 2/2003 | Price | G11B 5/5526 360/78.09 |
| 6,560,075 B2 * | 5/2003 | Price | G11B 5/4813 360/246.7 |
| 6,563,657 B1 * | 5/2003 | Serrano | G11B 5/5547 360/48 |
| 6,603,640 B1 | 8/2003 | Prater et al. | |
| 6,678,120 B2 | 1/2004 | Money | |
| 6,687,092 B2 | 2/2004 | Kan et al. | |
| 6,690,549 B1 * | 2/2004 | Aikawa | G11B 5/4813 360/264.4 |
| 6,735,032 B2 * | 5/2004 | Dunn | G11B 5/59633 360/31 |
| 6,819,513 B2 | 11/2004 | Chainer et al. | |
| 6,847,504 B1 | 1/2005 | Bennett et al. | |
| 7,031,115 B1 * | 4/2006 | Gilovich | G11B 5/4806 360/264.4 |
| 7,102,842 B1 | 9/2006 | Howard | |
| 7,146,623 B2 | 12/2006 | Kuwajima et al. | |
| 7,199,981 B2 | 4/2007 | Zabtcioglu | |
| 7,315,429 B2 * | 1/2008 | van Zyl | G11B 5/4806 360/61 |
| 7,385,781 B1 * | 6/2008 | Craig | G06F 3/0676 360/77.01 |
| 7,430,091 B2 | 9/2008 | Manasse | |
| 7,469,463 B2 | 12/2008 | Prater et al. | |
| 7,492,542 B2 | 2/2009 | van Zyl | |
| 7,710,683 B2 | 5/2010 | Craig et al. | |
| 7,760,463 B2 | 7/2010 | Ward et al. | |
| 7,961,435 B2 * | 6/2011 | Lee | G11B 5/5569 360/246.7 |
| 8,028,311 B2 | 9/2011 | Gilovich | |
| 8,611,052 B1 * | 12/2013 | Pan | G11B 5/4813 360/264.2 |
| 9,142,246 B1 * | 9/2015 | Trantham | G11B 19/048 |
| 9,361,919 B1 * | 6/2016 | Lieu | G11B 5/556 |
| 9,911,442 B1 * | 3/2018 | Kharisov | G11B 5/5547 |
| 9,972,347 B1 * | 5/2018 | Pan | G11B 5/295 |
| 10,090,017 B2 * | 10/2018 | Gartee | G11B 21/025 |
| 2002/0039259 A1 | 4/2002 | Koyama et al. | |
| 2002/0060885 A1 | 5/2002 | Money | |
| 2003/0090838 A1 | 5/2003 | Pottebaum et al. | |
| 2007/0297083 A1 | 12/2007 | Deguchi et al. | |
| 2009/0013342 A1 * | 1/2009 | Gilovich | G11B 5/4813 720/695 |
| 2012/0250177 A1 | 10/2012 | Somanache et al. | |

* cited by examiner

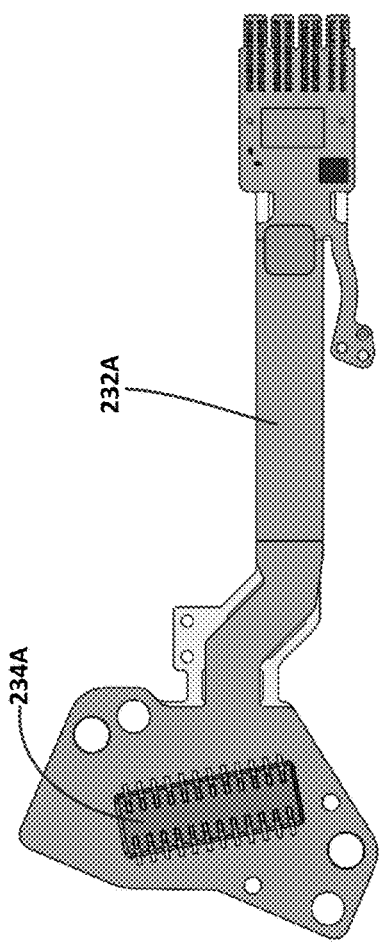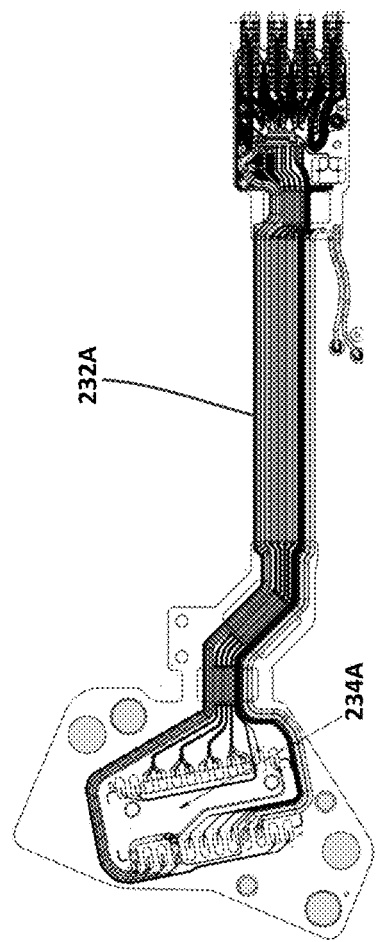
FIG. 12A
FIG. 12B

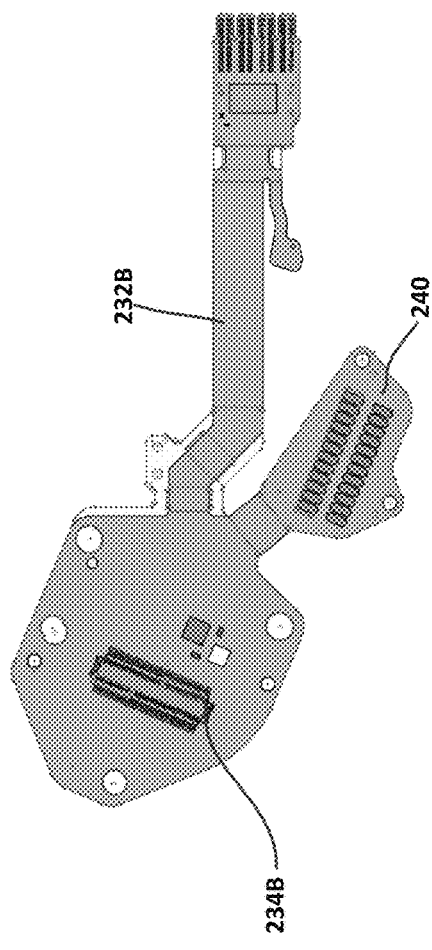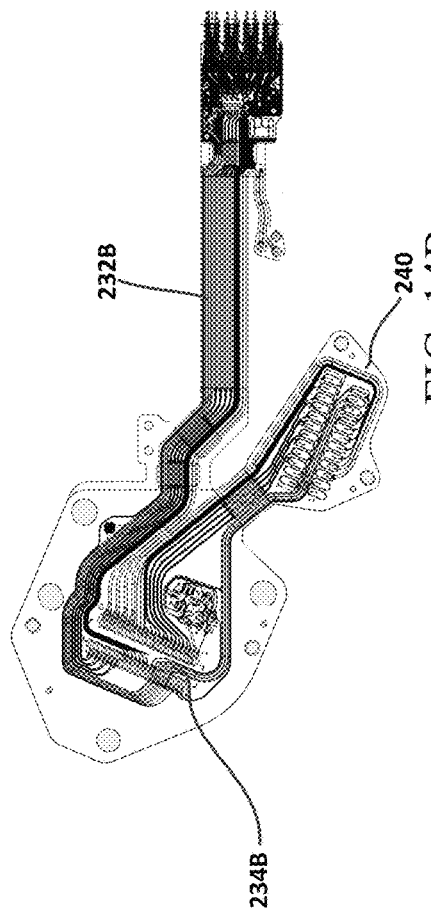

MULTI-ACTUATOR INTERCONNECTOR

SUMMARY

According to some embodiments of the present disclosure, a storage device includes a first actuator and a second actuator rotatable around a common axis. The storage device further includes a first electrical connector configured to communicate electrical signals to and from the first actuator, and a second electrical connector configured to communicate electrical signals to and from the second actuator and to communicate electrical signals to and from the first electrical connector. The storage device includes a hermetically-sealed body, the hermetically-sealed body including a base deck and a top cover, wherein the second electrical connector is configured to send and receive electrical signals to and from the first actuator and the second actuator through a single aperture in the hermetically-sealed body.

In some variations, the hermetically-sealed body is filled with an inert gas.

In some variations, the second electrical connector is configured to communicate electrical signals to and from the first electrical connector via a flex circuit.

In some variations, the flex circuit is configured to flex around a support member that is configured to support the first electrical connector.

In some variations, the storage device includes a first support member and a second support member, the first and second support members are coupled to and configured to secure the first and second electrical connectors.

In some variations, the storage device further includes a spacing member located between the first support member and the second support member.

In some variations, the first electrical connector is configured to communicate electrical signals at a first rate and wherein the second electrical connector is configured to communicate a volume of electrical signals at a second rate that is at least twice the first rate.

In some variations, the second electrical connector is configured to separate electrical signals to and from the second actuator from electrical signals to and from the first electrical connector.

According to another embodiment, a storage device comprises a body; a first actuator within the body, the first actuator being rotatable around a first axis; a first electrical connector within the body, the first electrical connector being configured to communicate electrical signals to and from the first actuator; a second actuator within the body, the second actuator being rotatable around the first axis; and a second electrical connector within the body, the second electrical connectors being configured to communicate electrical signals to and from the second actuator, the first electrical connector, and control circuitry located outside of the body.

In some variations, the second electrical connector is configured to communicate electrical signals to and from the second actuator, the first electrical connector, and circuitry located outside of the body through a single aperture in the body.

In some variations, the first actuator operates independently of the second actuator.

In some variations, the first actuator and the first electrical connector are configured to be removed from the body without removing the second actuator.

In some variations, the first actuator and the first electrical connector are configured to be removed from the body without removing the second electrical connector.

In some variations, the storage device further comprises at least one securement member located adjacent at least the first electrical connector, the at least one securement member being configured to resist compressive forces.

In some variations, the at least one securement member is further configured to maintain a spacing between the first electrical connector and the second electrical connector.

In some variations, the first actuator is located at a different elevation than the second actuator and wherein the first electrical connector is located at a different elevation than the second electrical connector.

In some variations, the first actuator is part of a first dynamic loop, wherein the second actuator is part of a second dynamic loop, and wherein the first dynamic loop is independent of the second dynamic loop.

In another embodiment, an electrical connector assembly for a hard drive employing at least two actuators includes: a first electrical connector configured to communicate electrical signals to and from a first actuator through a first dynamic loop; and a second electrical connector configured to communicate electrical signals to and from a second actuator through a second dynamic loop, the second electrical connector being further configured to communicate electrical signals to and from the first actuator via the first electrical connector and the first dynamic loop.

In some variations, the electrical connector assembly further comprises a support assembly coupled to the first electrical connector and the second electrical connector, the support assembly being configured to secure the first electrical connector and the second connector.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 12A shows an unfolded view of an electrical circuit for the upper assembly of FIG. 11.

FIG. 12B shows an electrical diagram of the electrical circuit of FIG. 12A.

FIG. 14A shows an unfolded view of an electrical circuit for the lower assembly of FIG. 13.

FIG. 14B shows an electrical diagram of the electrical circuit of FIG. 14A.

Figure 1:
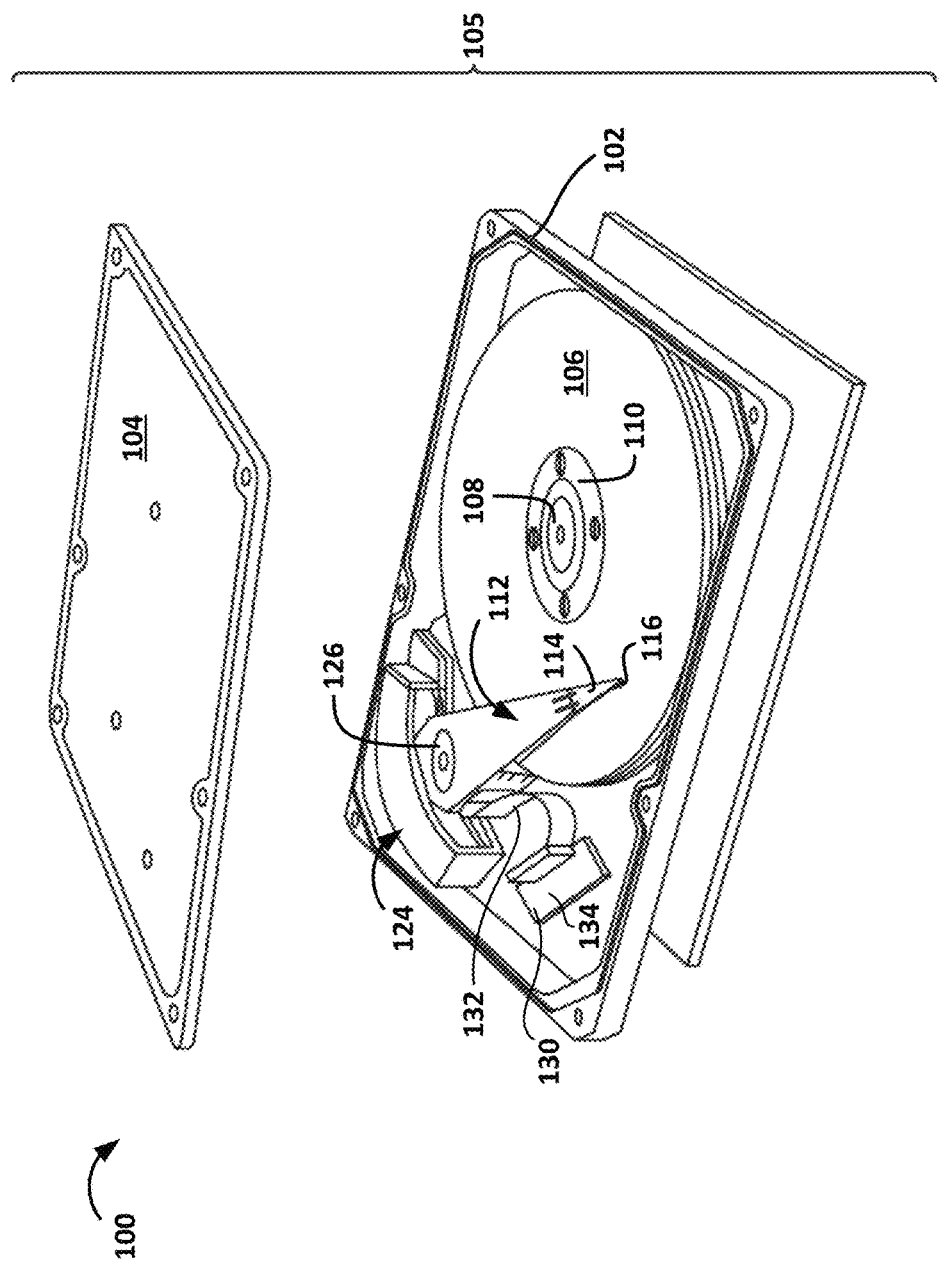
FIG. 1 shows an exploded, perspective view of a hard drive, in accordance with certain embodiments of the present disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

According to some embodiments of the present disclosure, and as shown in FIG. 1, a hard drive 100 includes a base deck 102 and top cover 104. Together, the base deck 102 and top cover 104 form a body 105 for the hard drive 100. The hard drive 100 includes magnetic recording discs 106 coupled to a spindle motor 108 by a disc clamp 110. The hard drive 100 also includes an actuator 112 coupled to a suspension assembly 114 that suspends read/write heads 116 over the magnetic recording discs 106. The read/write heads 116 may include multiple transducers, including write elements that write data to data tracks of the magnetic recording discs 106 and read elements that read data from the data tracks of the magnetic recording discs 106. In operation, the spindle motor 108 rotates the magnetic recording discs 106 while the actuator 112 is driven by a voice coil motor assembly 124 that rotates the actuator 112 around a pivot bearing 126. The actuator 112 may also include a microactuator positioned at least partially on or between the suspension assembly 114 and the read/write head 116. The hard drive 100 further includes a servo control system that controls the voice coil motor assembly 124 and the microactuator to position the read/write heads 116 over a desired track on the magnetic recording discs 106 for reading and writing operations.

Electrical signals representing the information to be written to or read from the magnetic recording discs 106, as well as electrical signals for instructing the voice coil motor assembly 124 are transmitted through an electrical connection assembly 130, which serves as a portal for communicating information between components inside the base deck 102 (e.g., actuator 112) and components outside the base deck 102 (e.g., control circuitry mounted on a printed circuit board (PCB)). In particular, the electrical connection assembly 130 includes a flexible conductive ribbon 132 that connects the actuator 112 and voice coil motor assembly 124 to an electrical connector 134. That electrical connector 134 connects to components outside the base deck 102 in order to communicate electrical signals (e.g., control signals or data signals) through the base deck 102.

Figure 2:
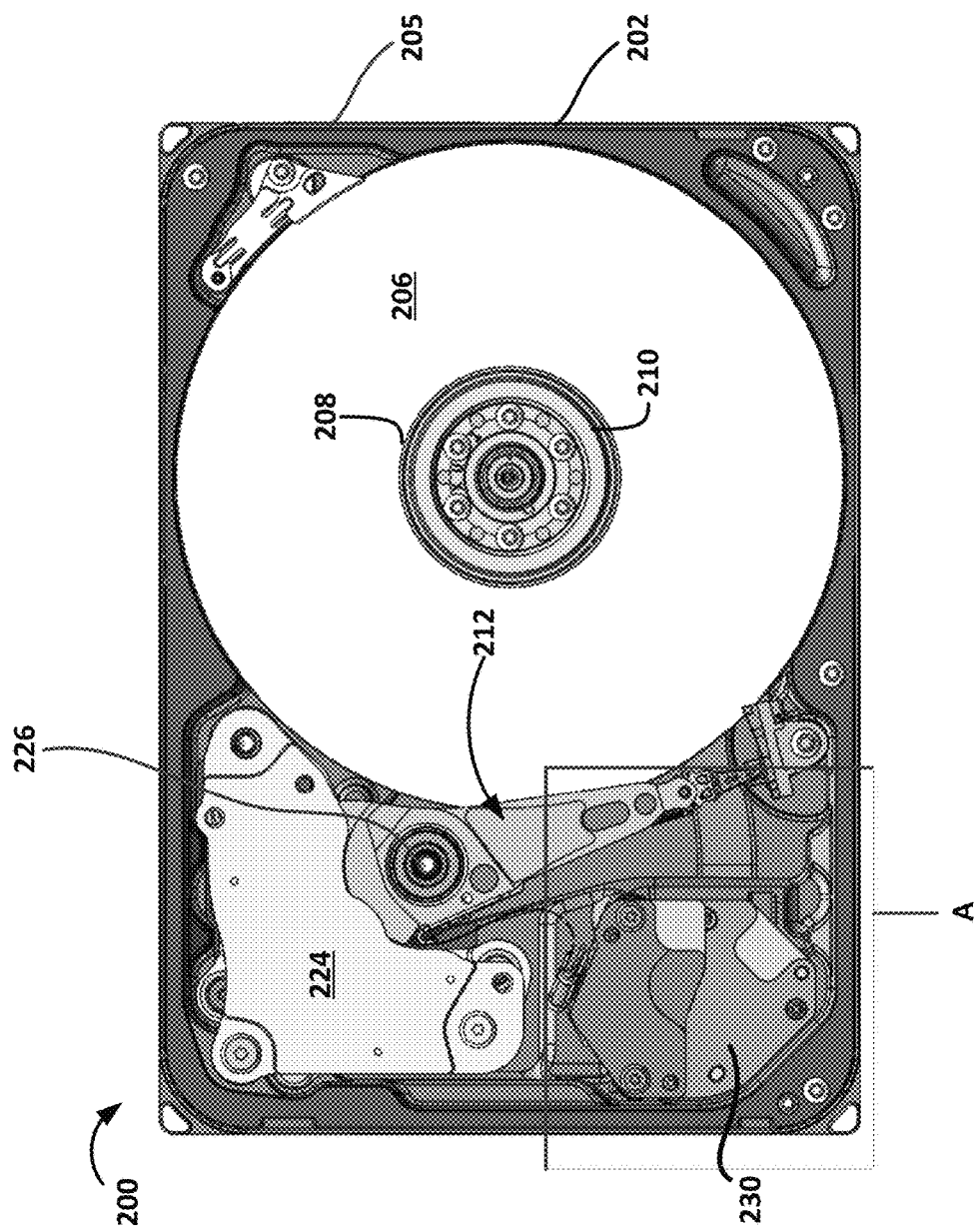
FIG. 2 shows a top view of a hard drive, in accordance with certain embodiments of the present disclosure.
Figure 3:
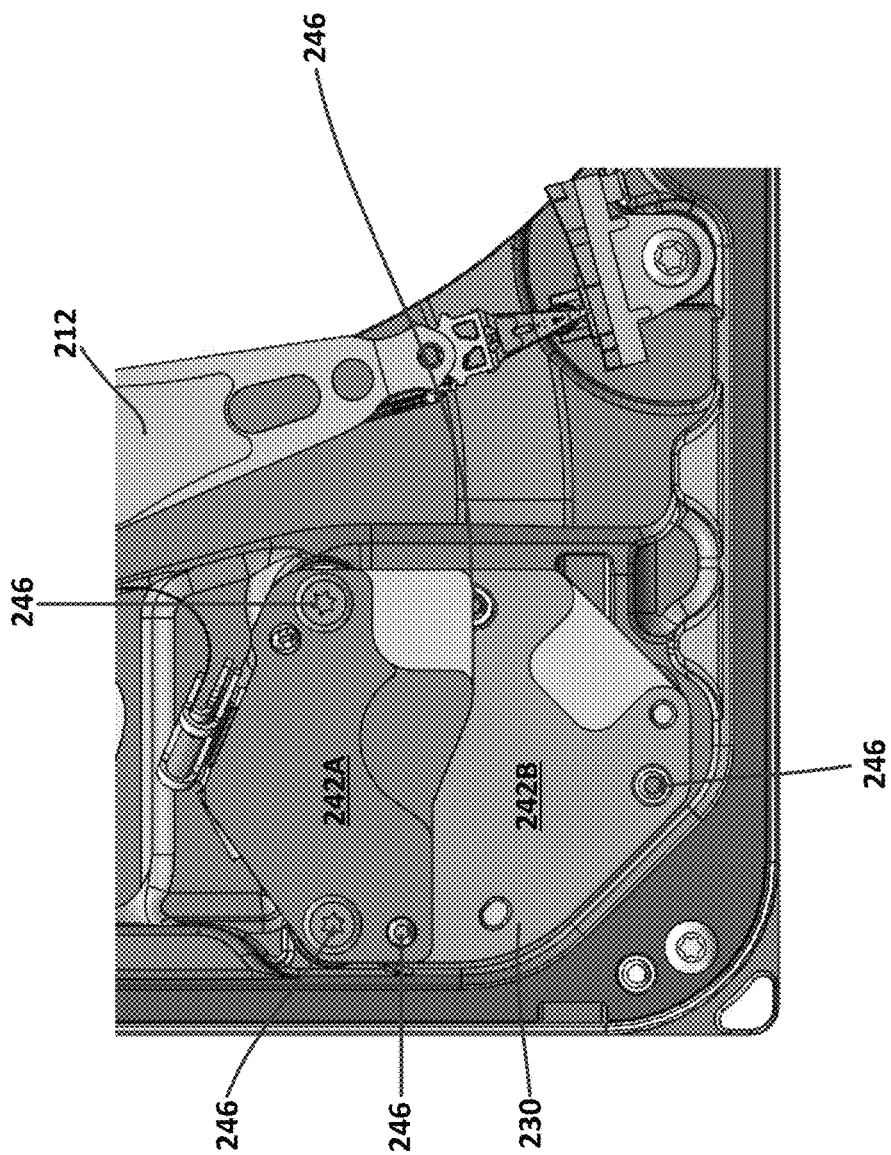
FIG. 3 shows an expanded view of box A in FIG. 2.
Figure 10:
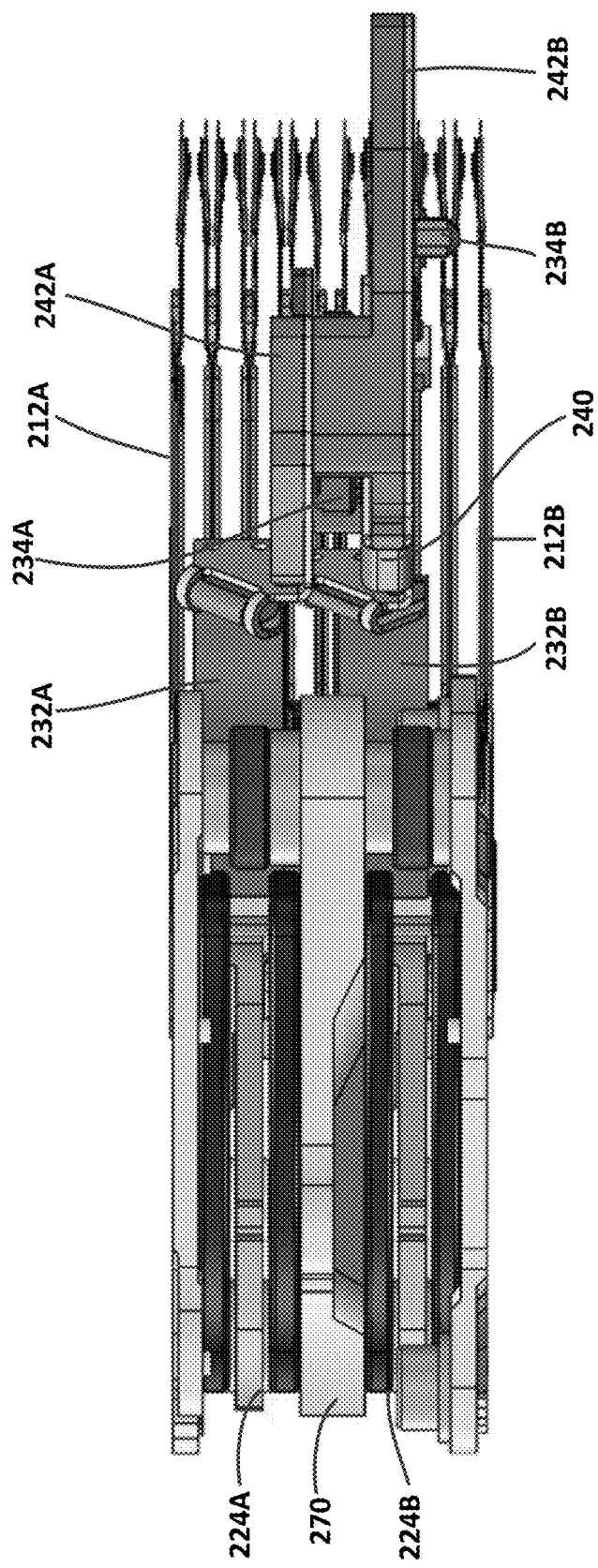
FIG. 10 shows a side view of two actuators, a multi-actuator interconnector, and surrounding components in accordance with certain embodiments of the present disclosure.

As discussed in more detail below, in some embodiments the actuator 112 can be an actuator assembly having two independent actuators that rotate on a common axis (e.g., a pivot bearing). In those embodiments, an electrical connection assembly includes multiple electrical connectors arranged to provide particular benefits. For example, FIG. 2 shows a hard drive 200 having a base deck 202 as part of the body 205 for the hard drive 200. The hard drive 200 includes magnetic recording discs 206 coupled to a spindle motor 208 by a disc clamp 210. The hard drive 200 also includes an actuator assembly 212 formed of multiple actuators. As better shown in, e.g., FIGS. 4, 11, and 13, the actuator assembly 212 includes a first actuator 212A and a second actuator 212B. These actuators (212A, 212B) suspend read/write heads over the magnetic recording discs 206. In operation, the spindle motor 208 rotates the magnetic recording discs 206 while the actuators 212A, 212B are driven by a voice coil motor assembly (VCMA) 224 around a common pivot bearing 226. As better shown in, e.g., FIG. 10, the VCMA 224 includes a first VCMA 224A, which drives the first actuator 212A, and a second VCMA 224B, which drives the second actuator 212B. Thus, in some embodiments, the first VCMA 224A and the first actuator 212A operate independently of the second VCMA 224B and the second actuator 212B. This increases the data input/output speed of the hard drive 200 compared to single VCMA/actuator systems. The first VCMA 224A and the first actuator 212A may be referred together jointly as an assembly, and the second VCMA 224B and the second actuator 212B may also be referred together jointly as an assembly. As discussed below in more detail, the first VCMA 224A and the first actuator 212A can be positioned above the second VCMA 224B and the second actuator 212B, such that the first VCMA 224A and the first actuator 212A may be referred to as an upper assembly while the second VCMA 224B and the second actuator 212B may be referred to as a lower assembly.

However, many dual-actuator systems require two communication ports, one for each VCMA/actuator pairing or assembly, which can significantly increase the risk of developing leaks within the base deck, among other issues. Developing leaks is particularly problematic if the drive enclosure of the base deck is filled with helium or other inert gases. To address that issue, in some embodiments electrical signals representing the information to be written to or read from the magnetic recording discs 206, as well as electrical signals for instructing the VCMA 224 (including, e.g., VCMA 224A and VCMA 224B) are transmitted through a single electrical connection assembly 230. In this manner, the electrical connection assembly 230 serves as a single communications port between components internal to the base deck 202 (e.g., the VCMAs and actuators) and components external to the base deck 202 (e.g., control circuitry on a PCB). The electrical connection assembly 230 can also be referred to as a multi-actuator interconnector. One advantage of this configuration is that the electrical connection assembly or multi-actuator interconnector 230 can communicate signals for both VCMAs and actuators using a single aperture, thus reducing the risk of leaks.

Figure 4:
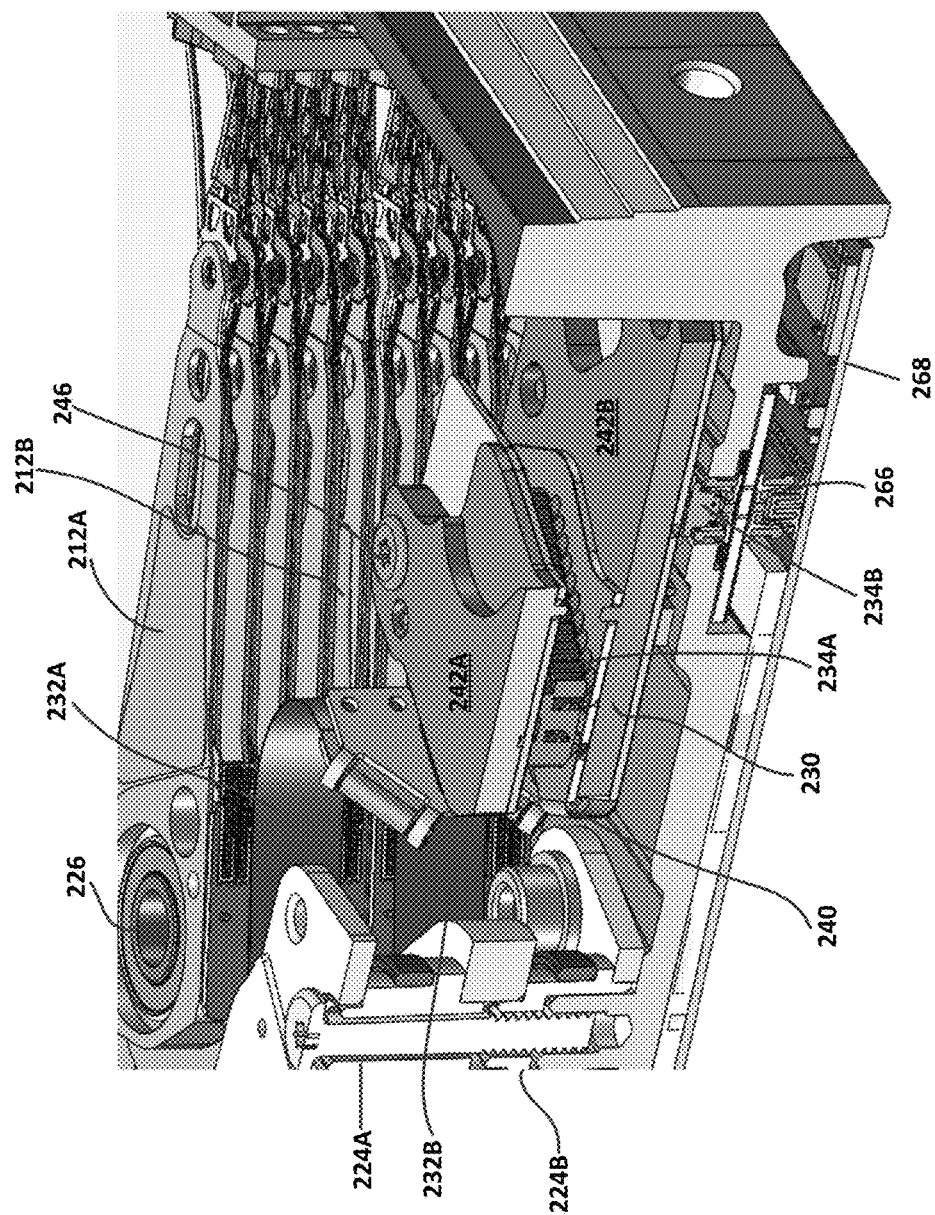
FIG. 4 shows a cut-away perspective view of a portion of the hard drive of FIG. 2.
Figure 5:
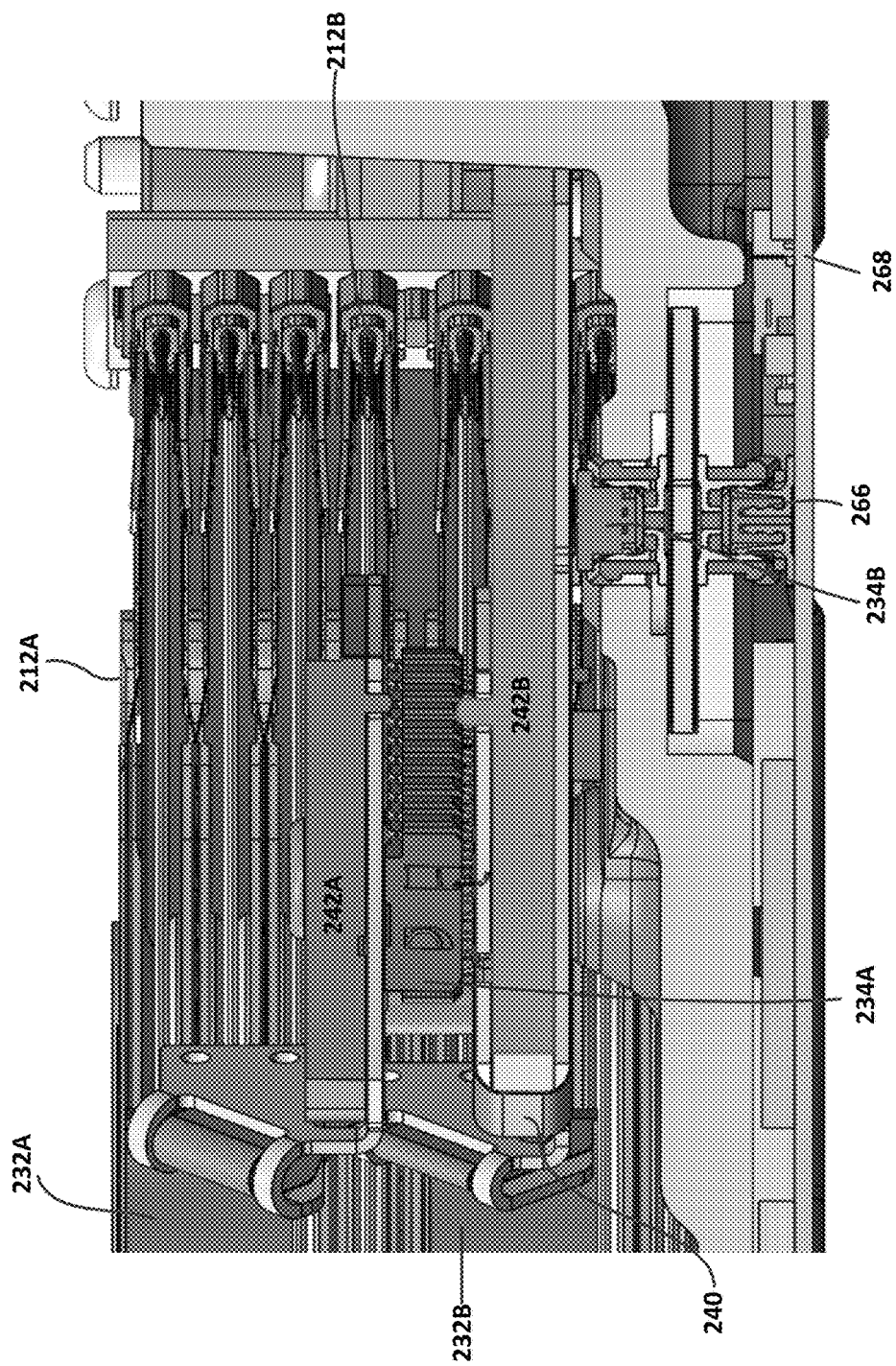
FIG. 5 shows a cut-away side view of a portion of the hard drive of FIG. 2.

For example, in some embodiments, and as shown in, e.g., FIG. 4, the electrical connection assembly 230 includes two flexible conductive ribbons 232A, 232B. The first flexible conductive ribbon 232A connects the first actuator 212A and the first VCMA 224A to a first electrical connector 234A. The second flexible conductive ribbon 232B connects the second actuator 212B and the second VCMA 224B to a second electrical connector 234B. The second electrical connector 234B connects to the first electrical connector 234A via a flex circuit 240. The second electrical connector 234B connects to external components (e.g., control circuitry on a PCB) located outside the base deck 202, using a single aperture in the base deck 202.

In this configuration, the second electrical connector 234B transmits electrical signals from electrical components external to the base deck 102 (e.g., control circuitry mounted on a PCB) to both VCMAs and actuators. Stated differently, the second electrical connector 234B is configured to communicate a set of electrical signals needed for the first VCMA 224A and the first actuator 212A, as well as a second set of electrical signals needed for the second VCMA 224B and the second actuator 212B. Accordingly, in some embodiments, the second electrical connector 234B handles at least twice the volume of electrical communications as the first electrical connector 234A in the same amount of time. This can be accomplished by using additional pins or channels in the second electrical connector or the like.

Figure 11:
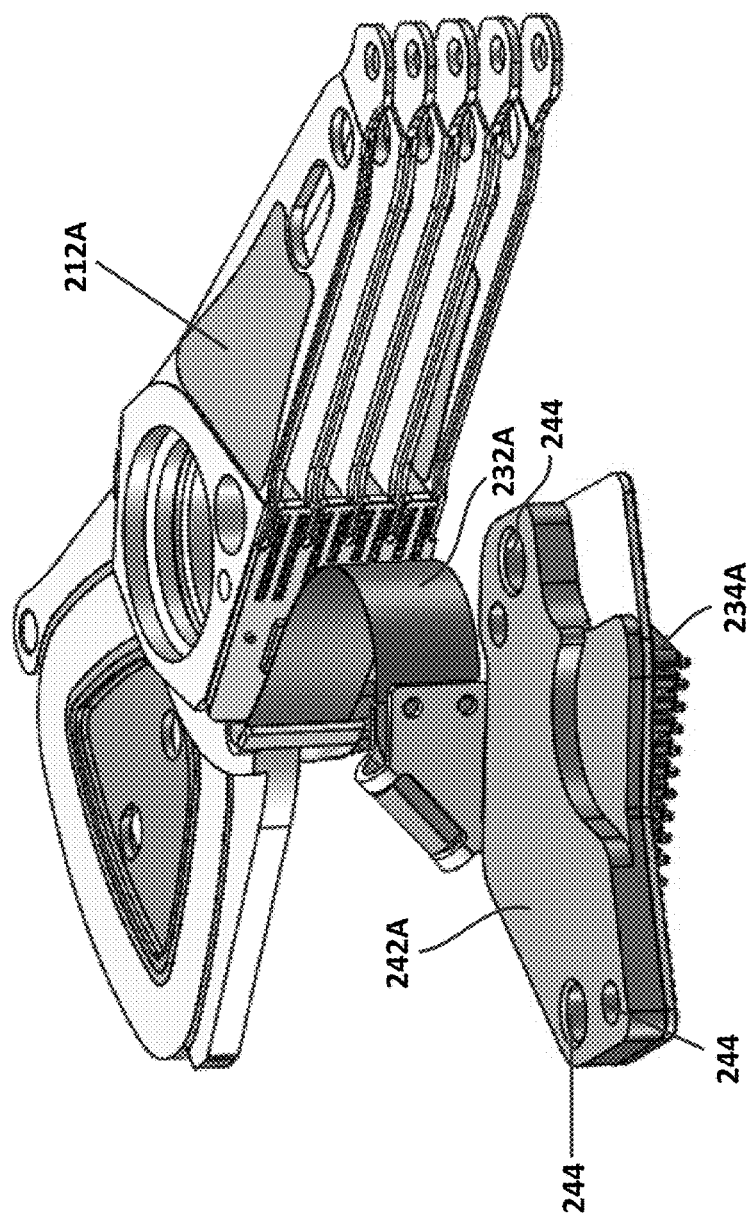
FIG. 11 shows a perspective view of an upper assembly in accordance with certain embodiments of the present disclosure.

As shown in, e.g., FIG. 11, the first flexible conductive ribbon 232A forms a first dynamic loop with the first VCMA 224A, the first actuator 212A, and the first electrical connector 234A. As shown in, e.g., FIG. 13, the second flexible conductive ribbon 232B forms a second dynamic loop with the second VCMA, 224B the second actuator 212B, and the second electrical connector 234B. Because the second connector 234B transmits a distinct set of signals to the first electrical connector 234A and to the second VCMA 224B and second actuator 212B, the first dynamic loop is independent from the second dynamic loop. This reduces the potential for interference and can be required for independent actuator operation.

Figure 8:
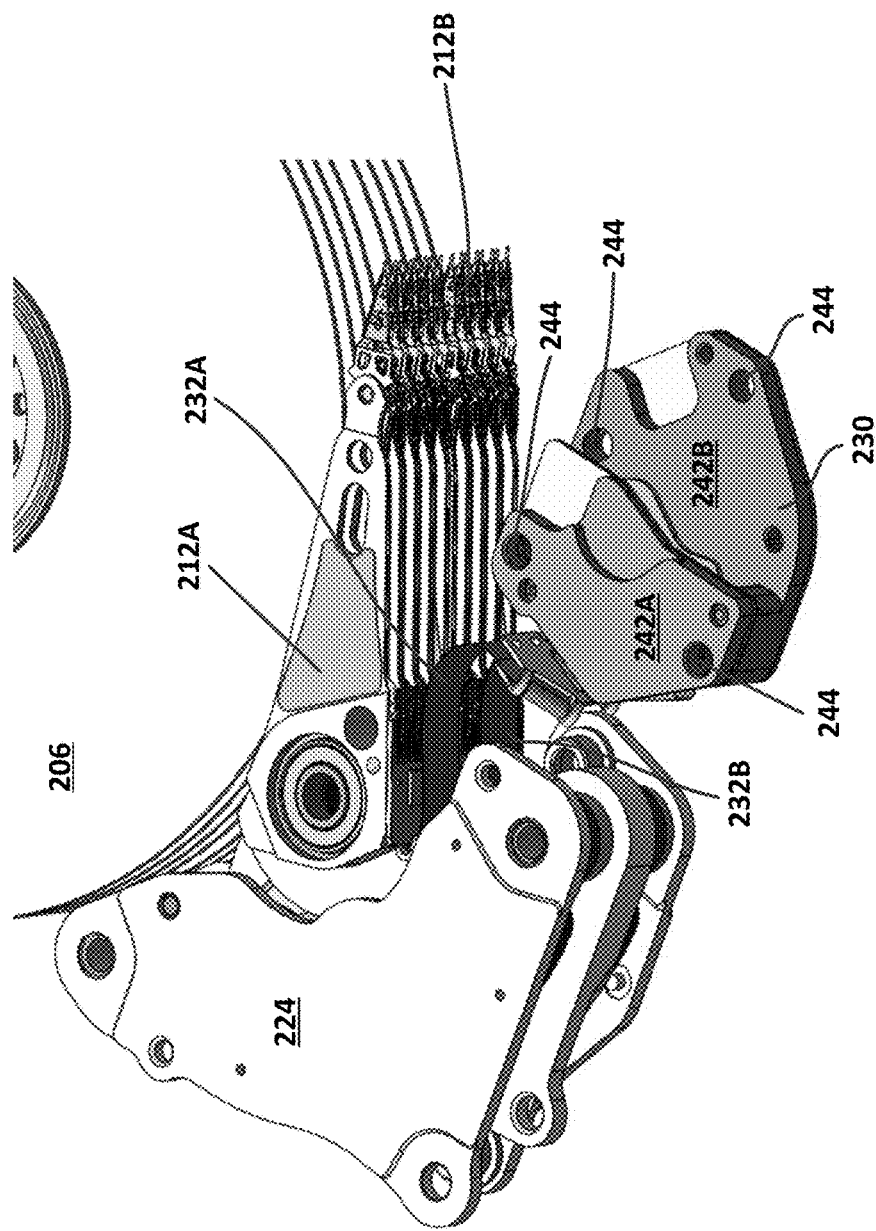
FIG. 8 shows a perspective view of two actuators, a multi-actuator interconnector, and surrounding components in accordance with certain embodiments of the present disclosure.
Figure 9:
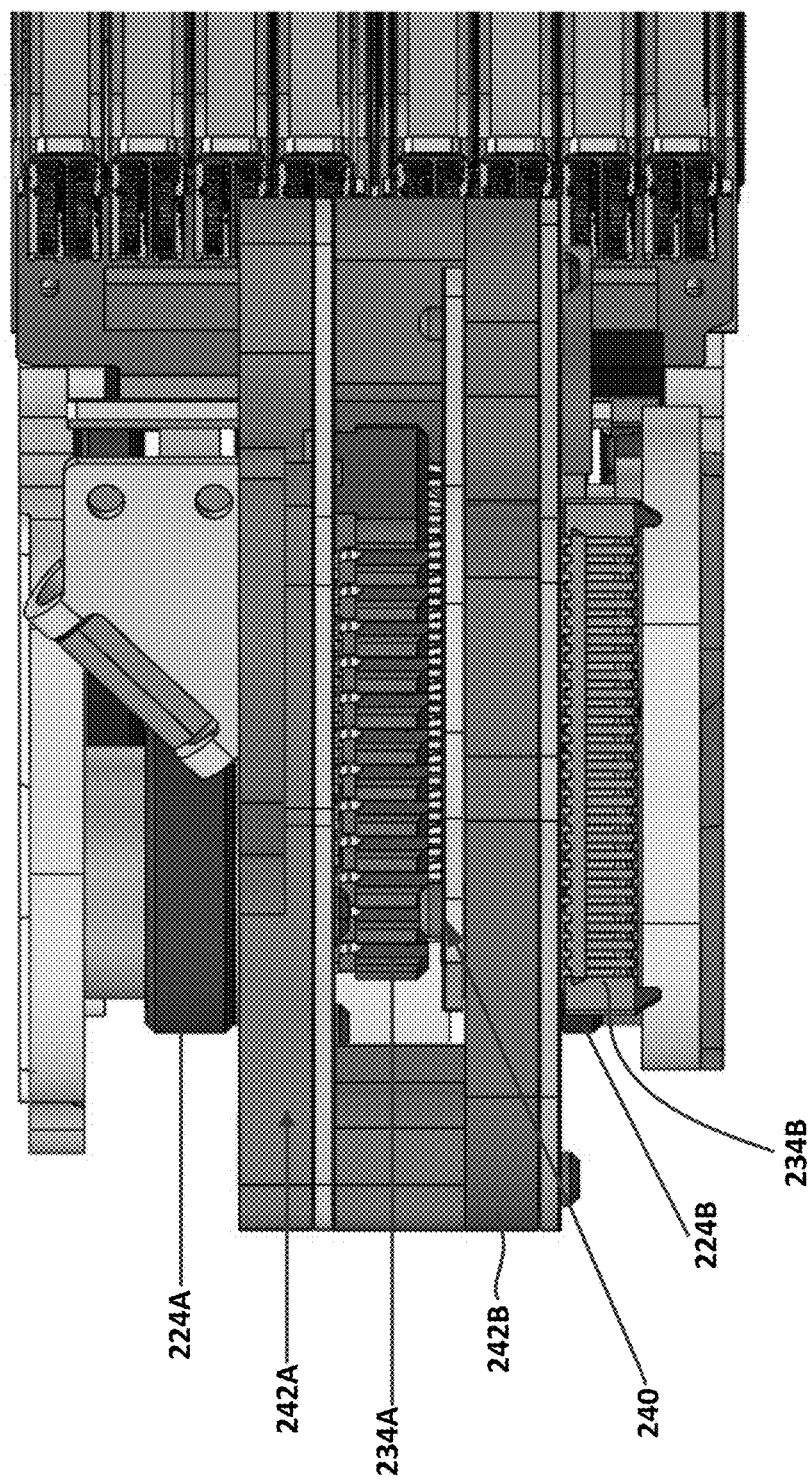
FIG. 9 shows a side view of a multi-actuator interconnector and surrounding components in accordance with certain embodiments of the present disclosure.
Figure 13:
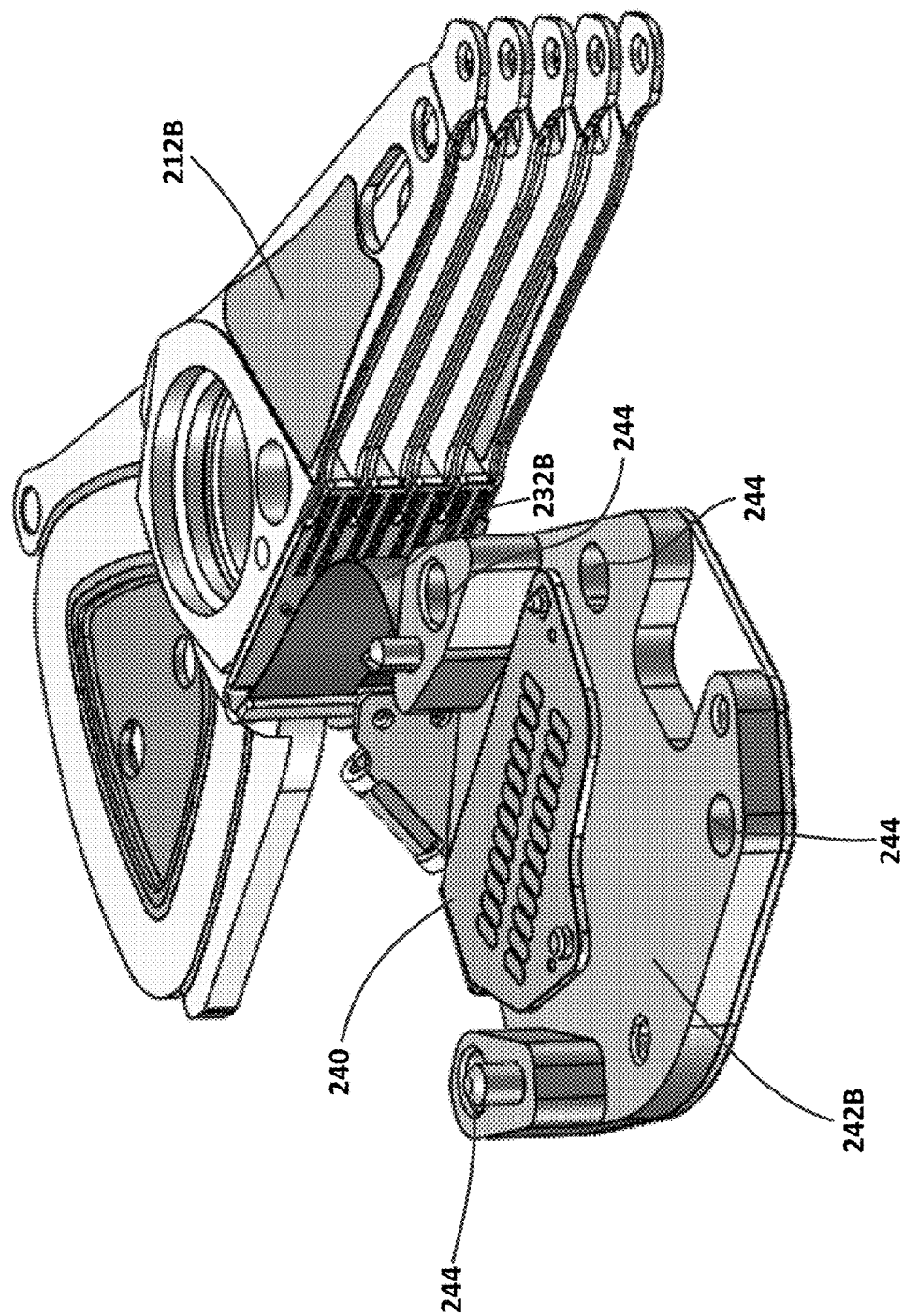
FIG. 13 shows a perspective view of a lower assembly in accordance with certain embodiments of the present disclosure.

As also shown in, e.g., FIGS. 8, 11, and 13, support members 242A and 242B (also called flex clamps) secure the first and second electrical connectors (234A, 234B) and provide resistance to flexing forces. In this manner the support members 242A, 242B can prevent compressive forces from bowing other components. In particular, a first support member 242A is located above the first electrical connector 234A. A second support member 242B is located below the first electrical connector 234A and above the second electrical connector 234B. These support members are made of a relatively stiff material, such as plastic or the like, in order to resist flexing forces exerted on the connection assemblies. These support members may also include a metallic layer, such as aluminum, which provides increased support and attachability and enables accurate placement. The support members include apertures 244 that receive securement members 246, such as screws, posts, or the like. The securement members 246 align and compress the support members 242A, 242B to retain the electrical connectors 234A, 234B in place and to maintain electrical connectivity.

Figure 6:
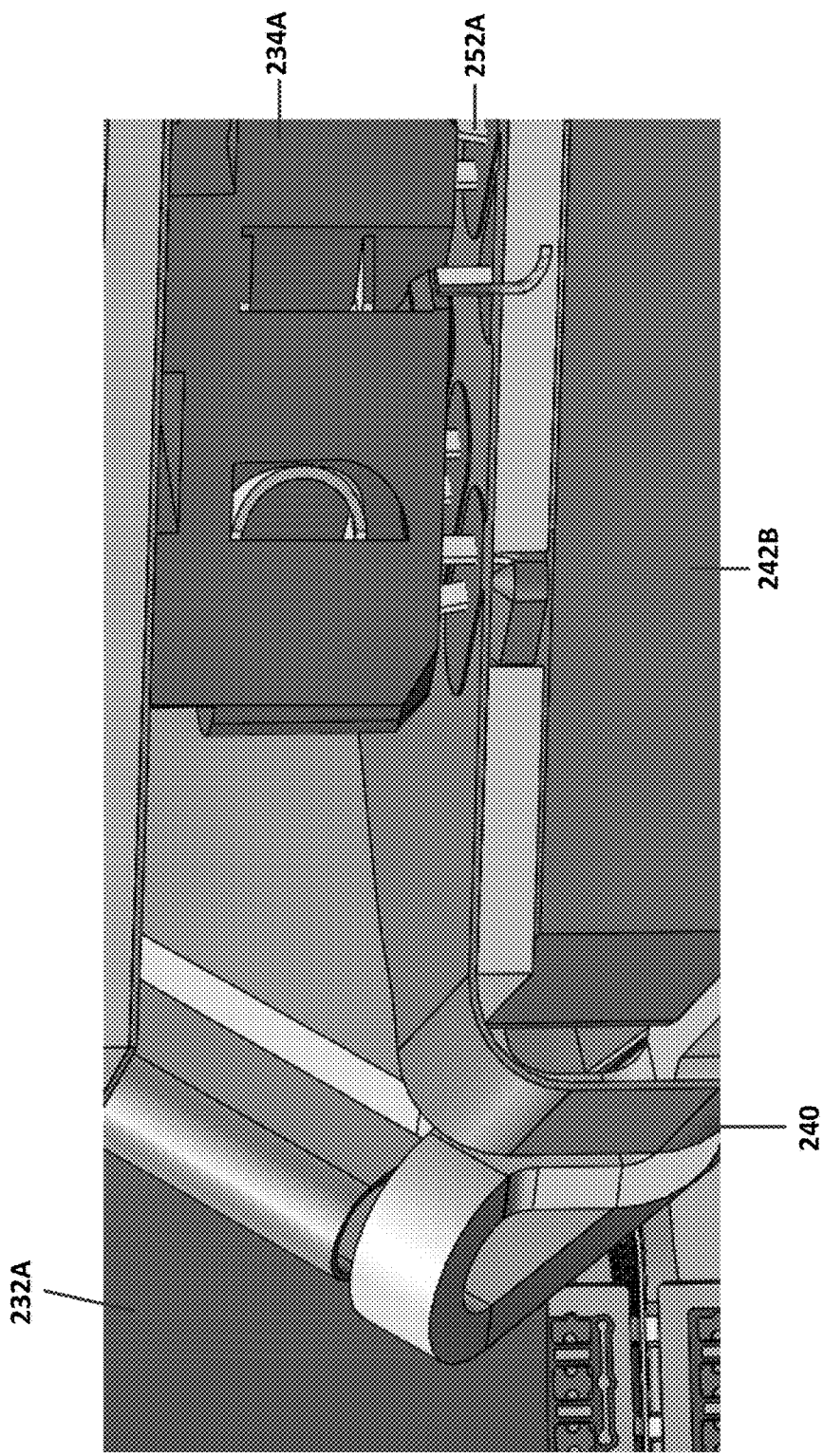
FIG. 6 shows a perspective view of a first electrical connector and surrounding components, in accordance with certain embodiments of the present disclosure.

In some embodiments, a flex circuit 240 electrically connects the first electrical connector 234A to the second electrical connector 234B. As shown in, e.g., FIG. 13, the flex circuit 240 wraps around the second support member 242B, contacting pins 252A or other electrical conduits on the bottom of the first electrical connector 234A (as best seen in FIG. 6) and pins 252B or other electrical conduits on the top end of the second electrical connector 234B (as best seen in FIG. 7).

Figure 7:
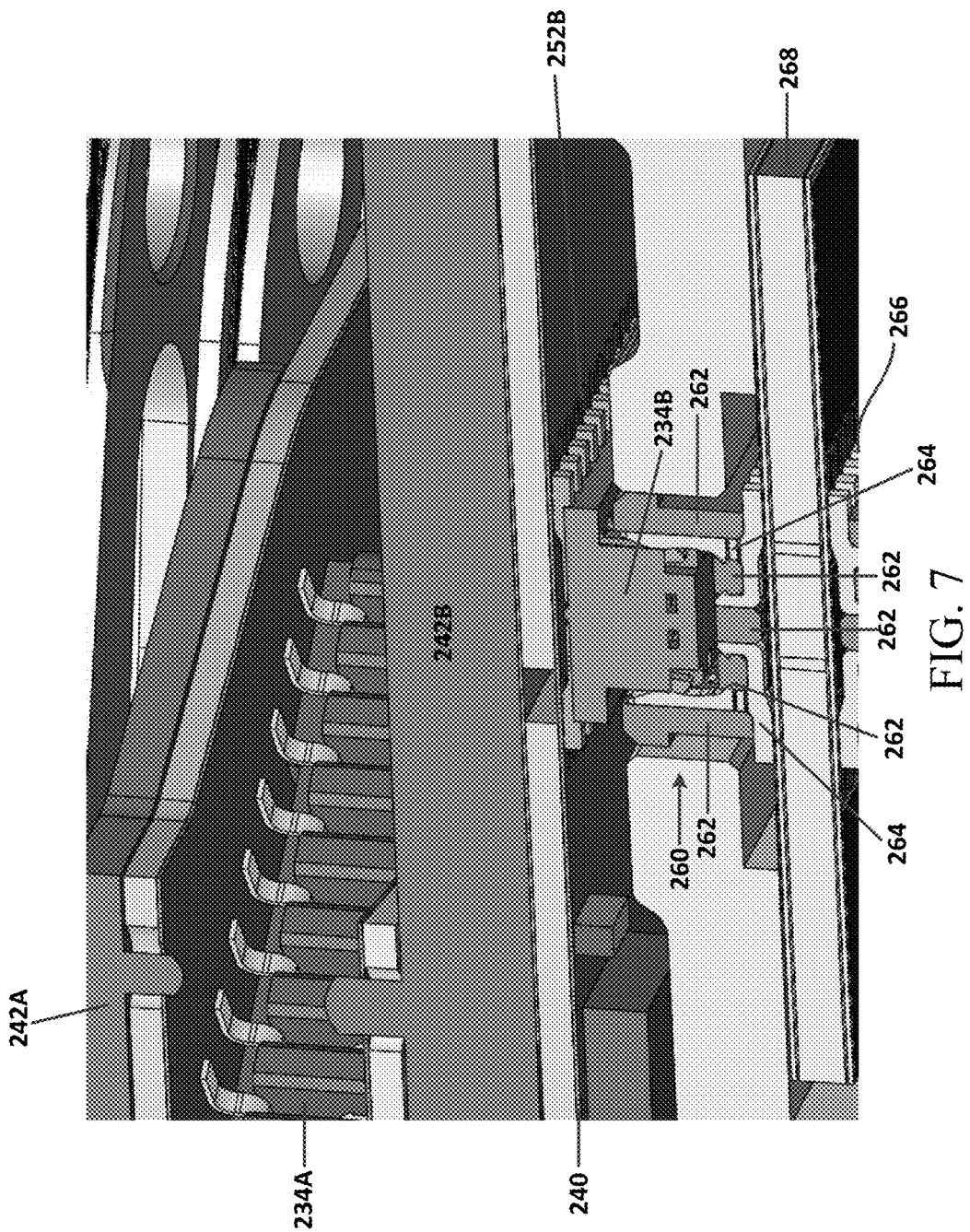
FIG. 7 shows a cut-away perspective view showing a first electrical connector, a second electrical connector, and surrounding components in accordance with certain embodiments of the present disclosure.

As best seen in FIG. 7, the second electrical connector 234B communicates signals through a single aperture 260 in the base deck 202. Sealing elements, such as gaskets or the like (e.g., 362 in FIG. 19), connector housing 262, which isolates and protects the electrical conduits in the connector, and electrical conduits 264 may be used to hermetically seal the aperture 260 while enabling communications with external components (e.g., control circuitry 266 on a PCB 268). As discussed above, communicating signals for both VCMAs and actuators through a single aperture reduces the likelihood of leaks and other such problems.

In these configurations, the first VCMA 224A is located at a different, higher elevation than the second VCMA 224B. Similarly, the first actuator 212A is located at a different, higher elevation than the second actuator 212B. The first electrical connector 234A is located at a different, higher elevation than the second electrical connector 234B. The first flexible conductive ribbon 232A is located at a different, higher elevation than the second conductive ribbon 232B. In some embodiments, spacing elements (e.g., spacing element 270 in FIG. 10 and/or the support members 242A, 242B) can separate the two VCMAs and/or the two electrical connectors. As discussed below in more detail, these arrangements facilitate easier installation and/or repair. Arranging some or all of these components in this fashion further reduces the footprint required within the base deck. Arranging some or all of these components in this fashion also enables better use of the elevational space within the base deck.

Figure 15:
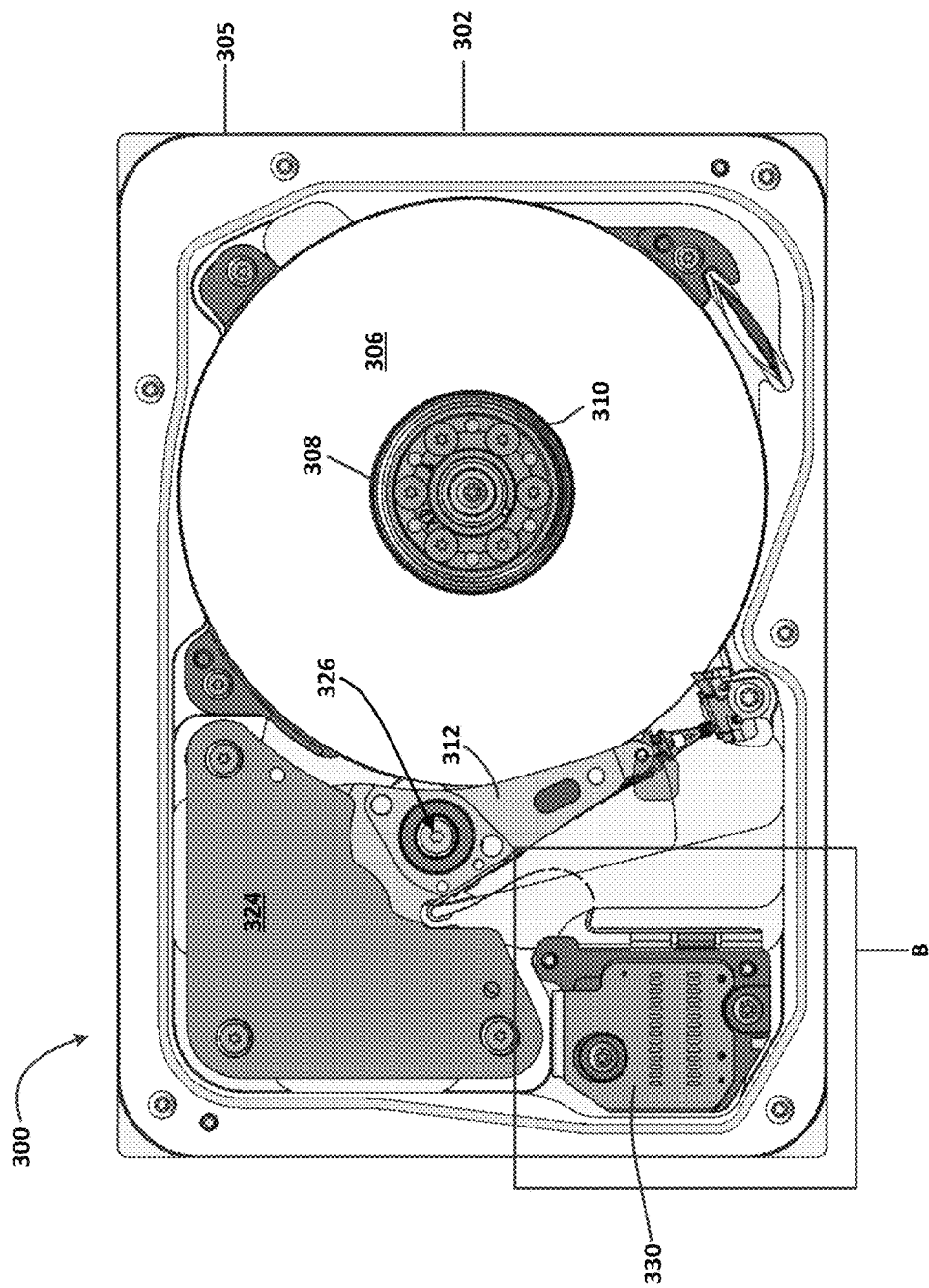
FIG. 15 shows a top view of a hard drive, in accordance with certain embodiments of the present disclosure.
Figure 16:
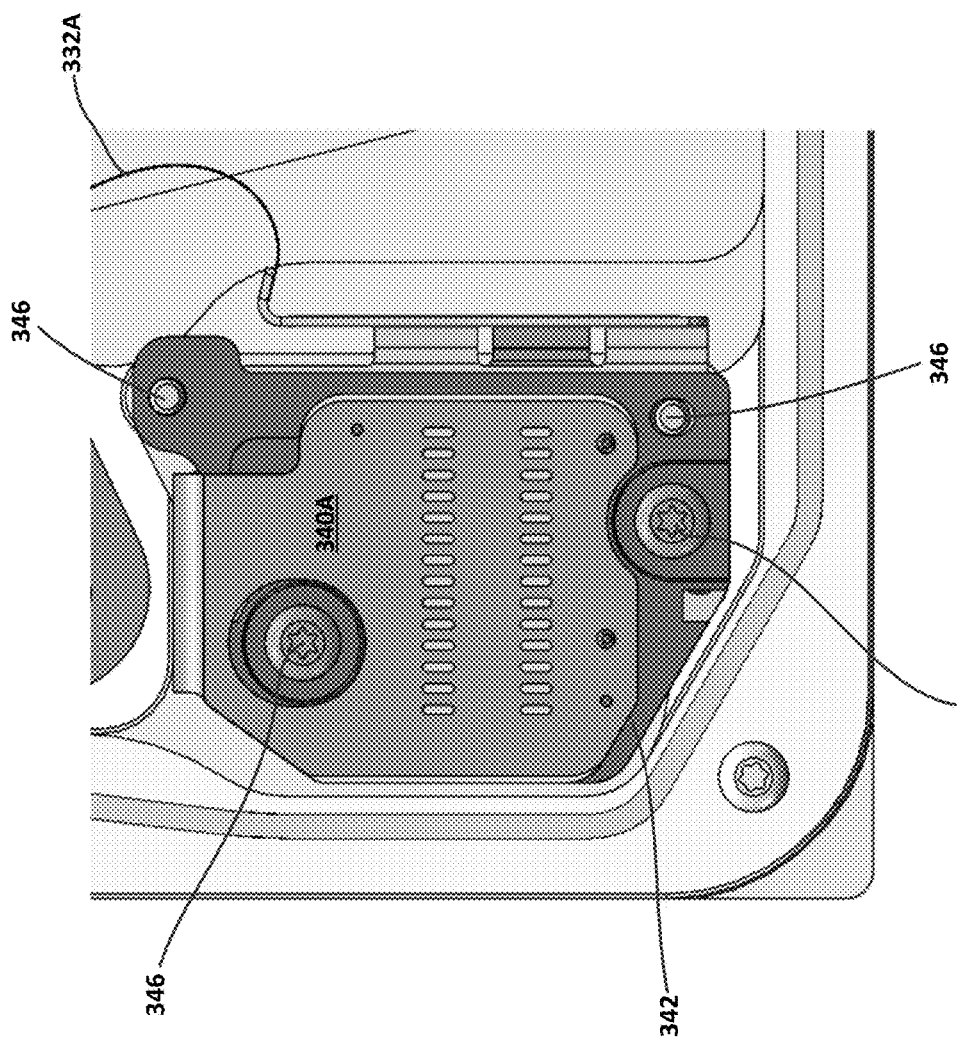
FIG. 16 shows an expanded view of box B in FIG. 15.

As shown in FIGS. 15-25, in some embodiments the electrical connectors can have a similar or substantially identical profile for easier manufacturing and installation. Those electrical connectors can also be stacked vertically to reduce the footprint with the base deck. In particular, FIG. 15 shows a hard drive 300 having a base deck 302 as part of the body 305 for the hard drive 300. The hard drive 300 includes magnetic recording discs 306 coupled to a spindle motor 308 by a disc clamp 310. The hard drive 300 also includes an actuator assembly 312 formed of multiple actuators. As better shown in, e.g., FIG. 21, the actuator assembly 312 includes a first actuator 312A and a second actuator

312B. These actuators (312A, 312B) suspend read/write heads over the magnetic recording discs 306. In operation, the spindle motor 308 rotates the magnetic recording discs 306 while the actuators 312A, 312B are driven by a voice coil motor assembly (VCMA) 324 around a common pivot bearing 326. As better shown in, e.g., FIG. 23, the VCMA 324 includes a first VCMA 324A, which drives the first actuator 312A, and a second VCMA 324B, which drives the second actuator 312B. Thus, in this embodiment, the first VCMA 324A and the first actuator 312A operate independently of the second VCMA 324B and the second actuator 312B. This increases the data input/output speed of the hard drive 300 compared to single VCMA/actuator systems.

However, many dual-actuator systems require two communication ports, one for each VCMA/actuator pairing, which can significantly increase the risk of developing leaks within the base deck, among other issues. Developing leaks can be particularly problematic if the base deck is filled with helium or other inert gases. To address that issue, in some embodiments electrical signals representing the information to be written to or read from the magnetic recording discs 306, as well as electrical signals for instructing the VCMA 324 (including, e.g., VCMA 324A and VCMA 324B) are transmitted through a single electrical connection assembly 330. In this manner, the electrical connection assembly 330 serves as a single communications port between components internal to the base deck 302 (e.g., the VCMAs and actuators) and components external to the base deck (e.g., control circuitry on a PCB). One advantage of this configuration is that the electrical connection assembly 330 can communicate signals for both VCMAs and actuators using a single aperture, thus reducing the risk of leaks.

Figure 21:
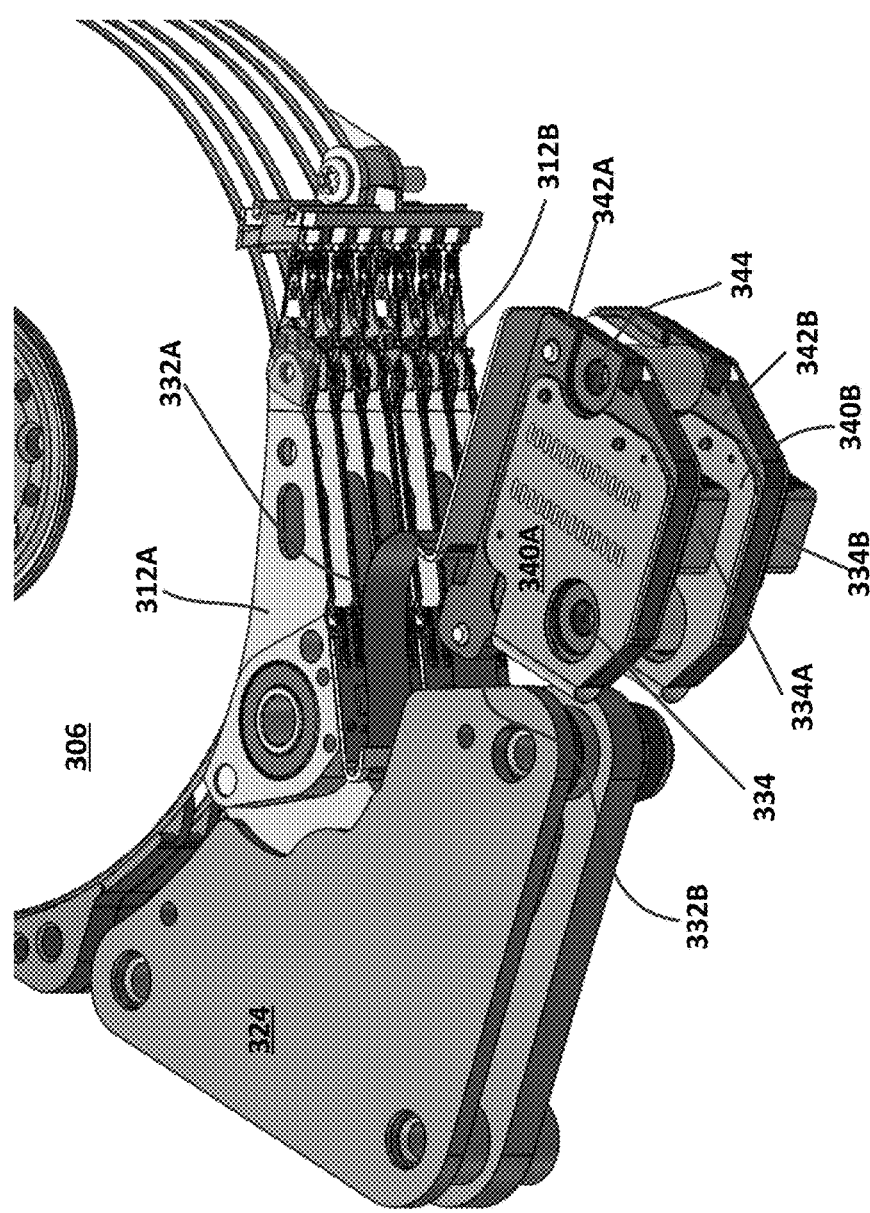
FIG. 21 shows a perspective view of two actuators, a multi-actuator interconnector, and surrounding components in accordance with certain embodiments of the present disclosure.
Figure 22:
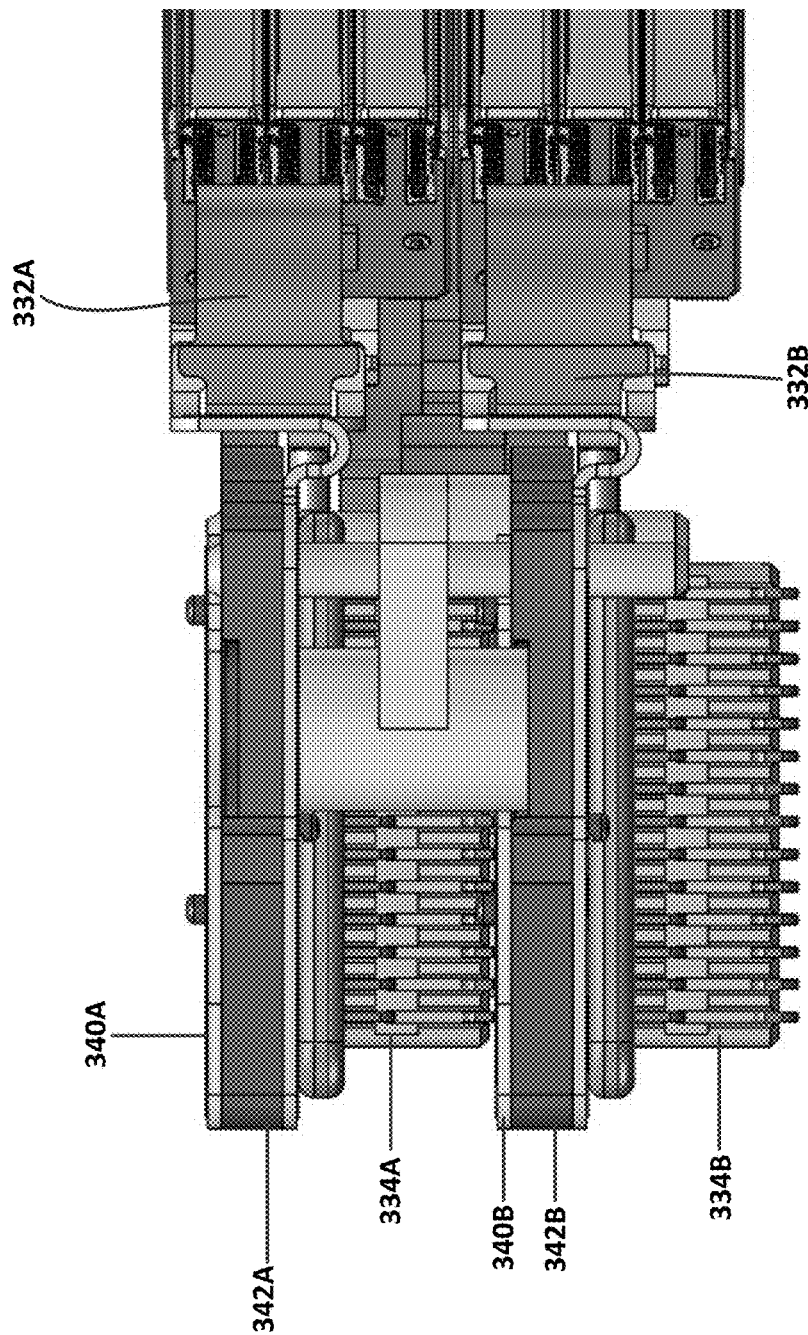
FIG. 22 shows a side view of a multi-actuator interconnector and surrounding components in accordance with certain embodiments of the present disclosure.
Figure 23:
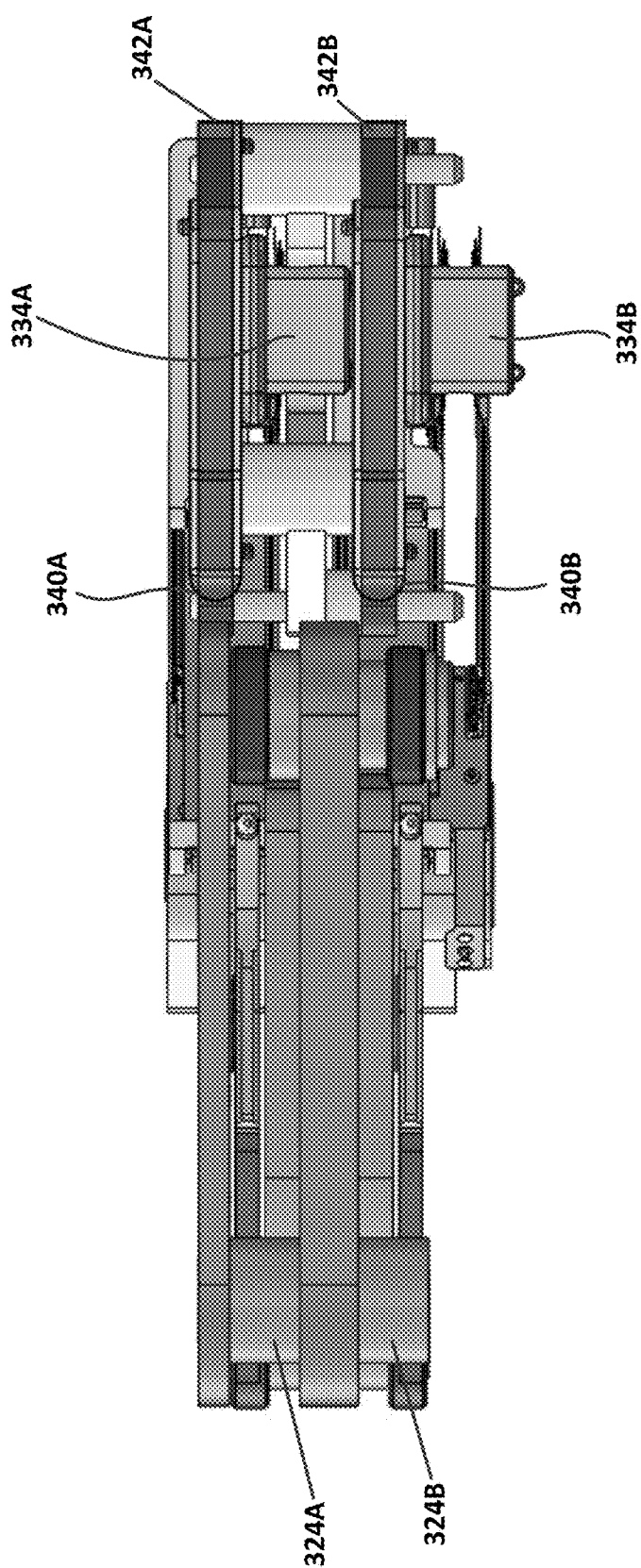
FIG. 23 shows a side view of two voice coil motor assemblies, a multi-actuator interconnector, and surrounding components in accordance with certain embodiments of the present disclosure.
Figure 24:
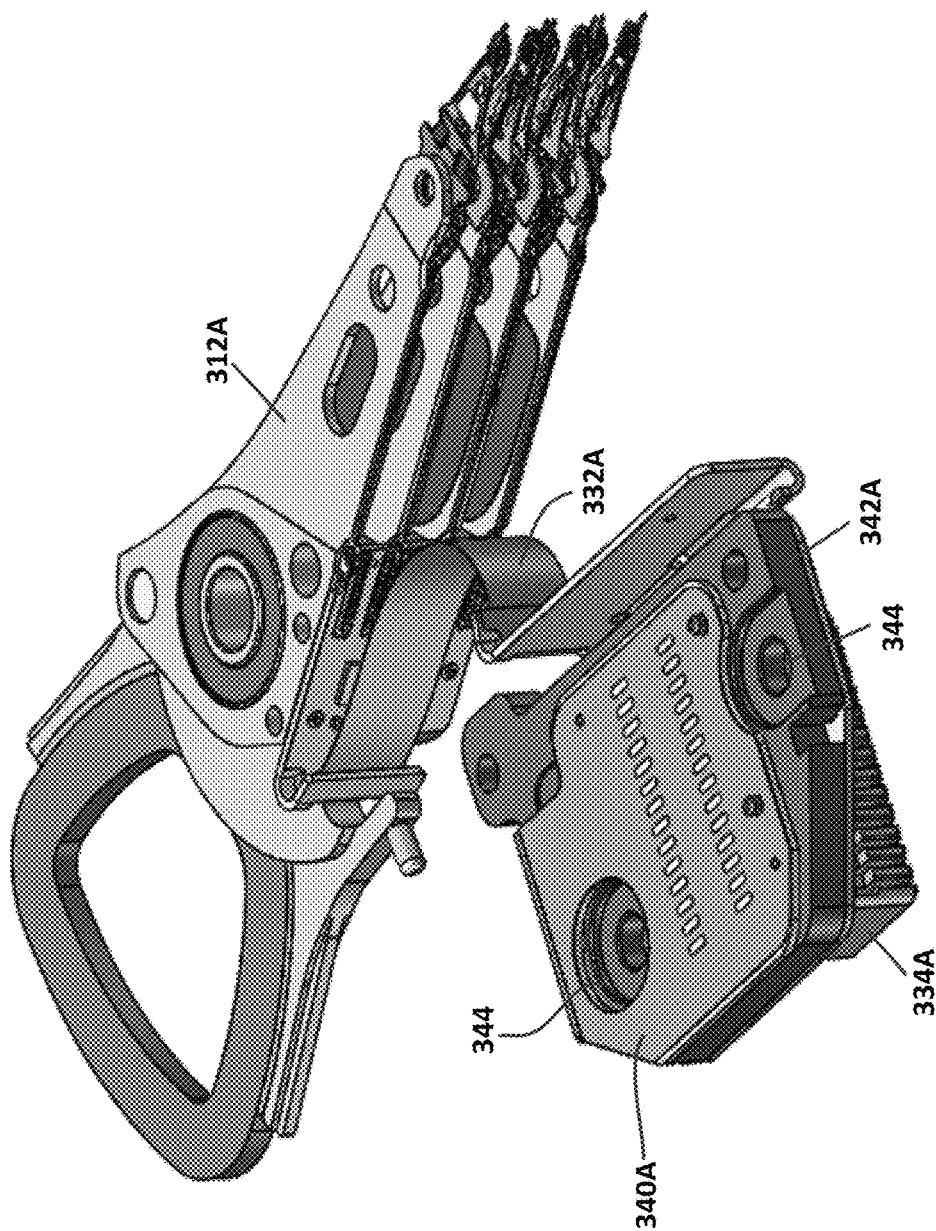
FIG. 24 shows a perspective view of an individual assembly in accordance with certain embodiments of the present disclosure.
Figure 25A:
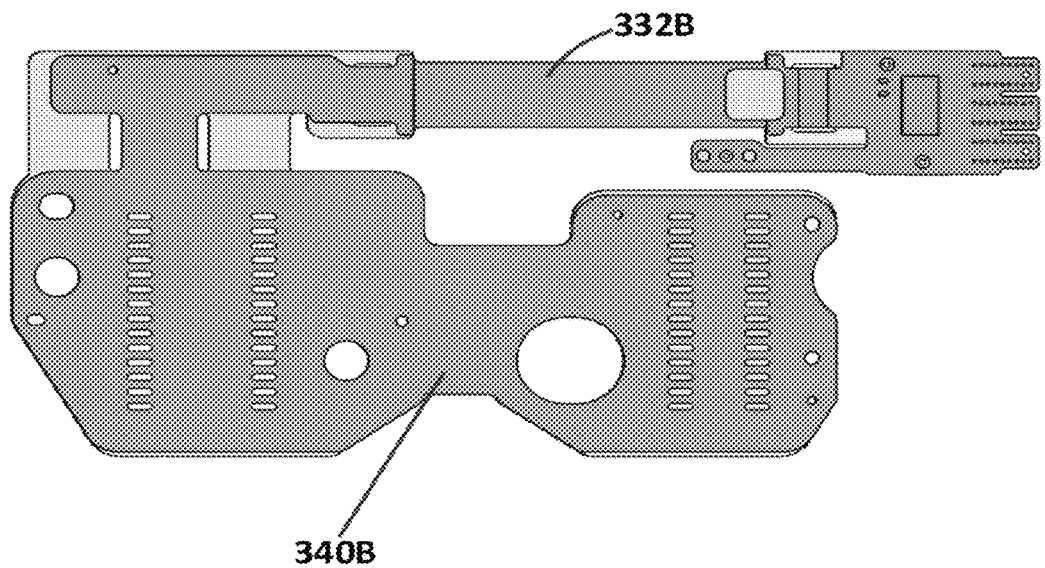
FIG. 25A shows an unfolded view of an electrical circuit for the assembly of FIG. 24.
Figure 25B:
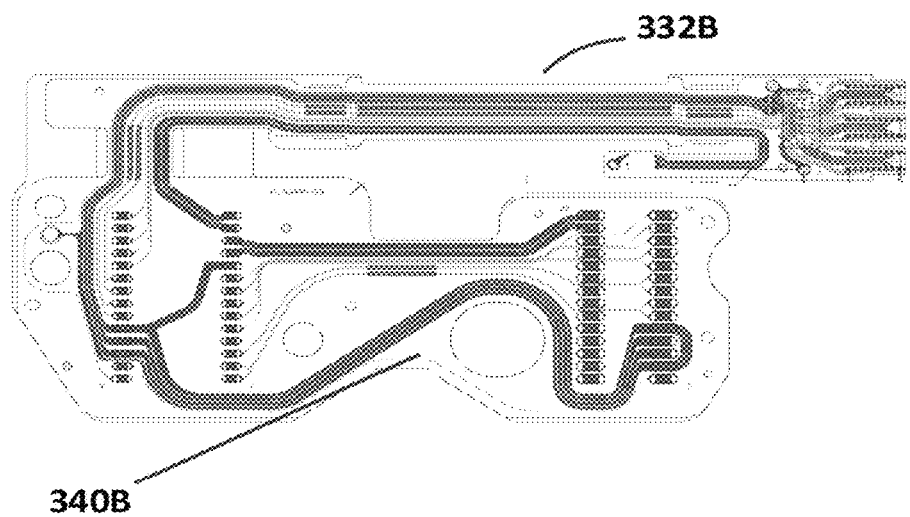
FIG. 25B shows an electrical diagram of the electrical circuit of FIG. 25A.

For example, in some embodiments, and as shown in, e.g., FIG. 21, the electrical connection assembly 330 includes two flexible conductive ribbons 332A, 332B. The first flexible conductive ribbon 332A connects the first actuator 312A and the first VCMA 324A to a first electrical connector 334A. The second flexible conductive ribbon 332B connects the second actuator 312B and the second VCMA 324B to a second electrical connector 334B. The second electrical connector 334B to the first electrical connector 334A via a flex circuit 340B. Another flex circuit 340A is located above the first electrical connector 334A. The second electrical connector 334B connects to external components (e.g., control circuitry on a PCB) located outside the base deck 302, using a single aperture in the base deck 302.

In this configuration, the second electrical connector 334B transmits electrical signals from electrical components external to the base deck 102 (e.g., control circuitry mounted on a PCB) to both VCMAs and actuators. Stated differently, the second electrical connector 334B is configured to communicate a set of electrical signals needed for the first VCMA 324A and the first actuator 312A, as well as a second set of electrical signals needed for the second VCMA 324B and the second actuator 312B. Accordingly, in some embodiments, the second electrical connector 334B handles at least twice the volume of electrical communications as the first electrical connector 334A in the same amount of time. This can be accomplished by using additional pins or channels in the second electrical connector or the like.

As shown in, e.g., FIG. 21, the first flexible conductive ribbon 332A forms a first dynamic loop with the first VCMA 324A, the first actuator 312A, and the first electrical connector 334A. As shown in, e.g., FIG. 21, the second flexible conductive ribbon 332B forms a second dynamic loop with the second VCMA, 324B the second actuator 312B, and the second electrical connector 334B. Because the second connector 334B transmits a distinct set of signals to the first electrical connector 334A and to the second VCMA 324B and second actuator 312B, the first dynamic loop is independent from the second dynamic loop. This reduces the potential for interference.

Figure 17:
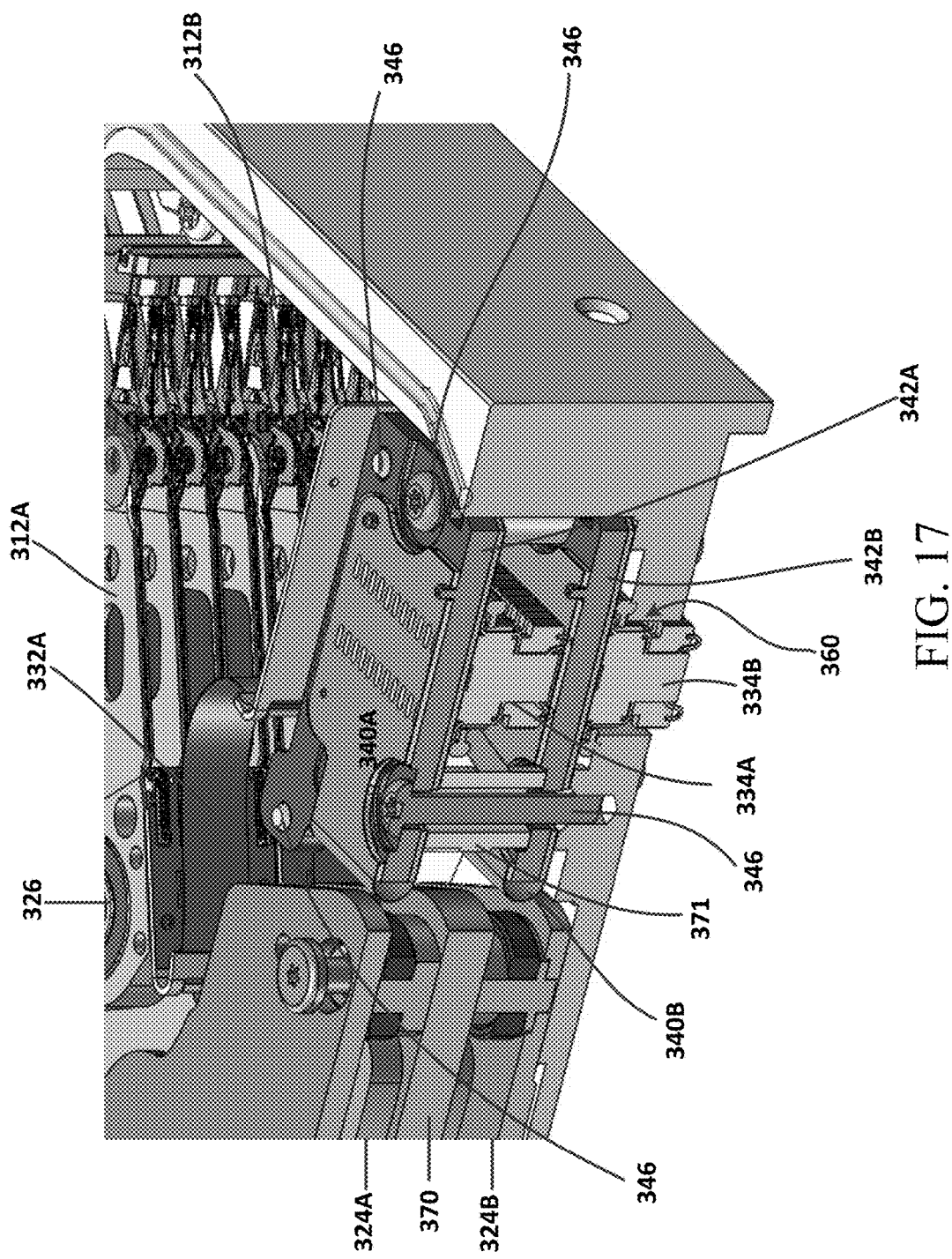
FIG. 17 shows a cut-away perspective view of a portion of the hard drive of FIG. 15.
Figure 18:
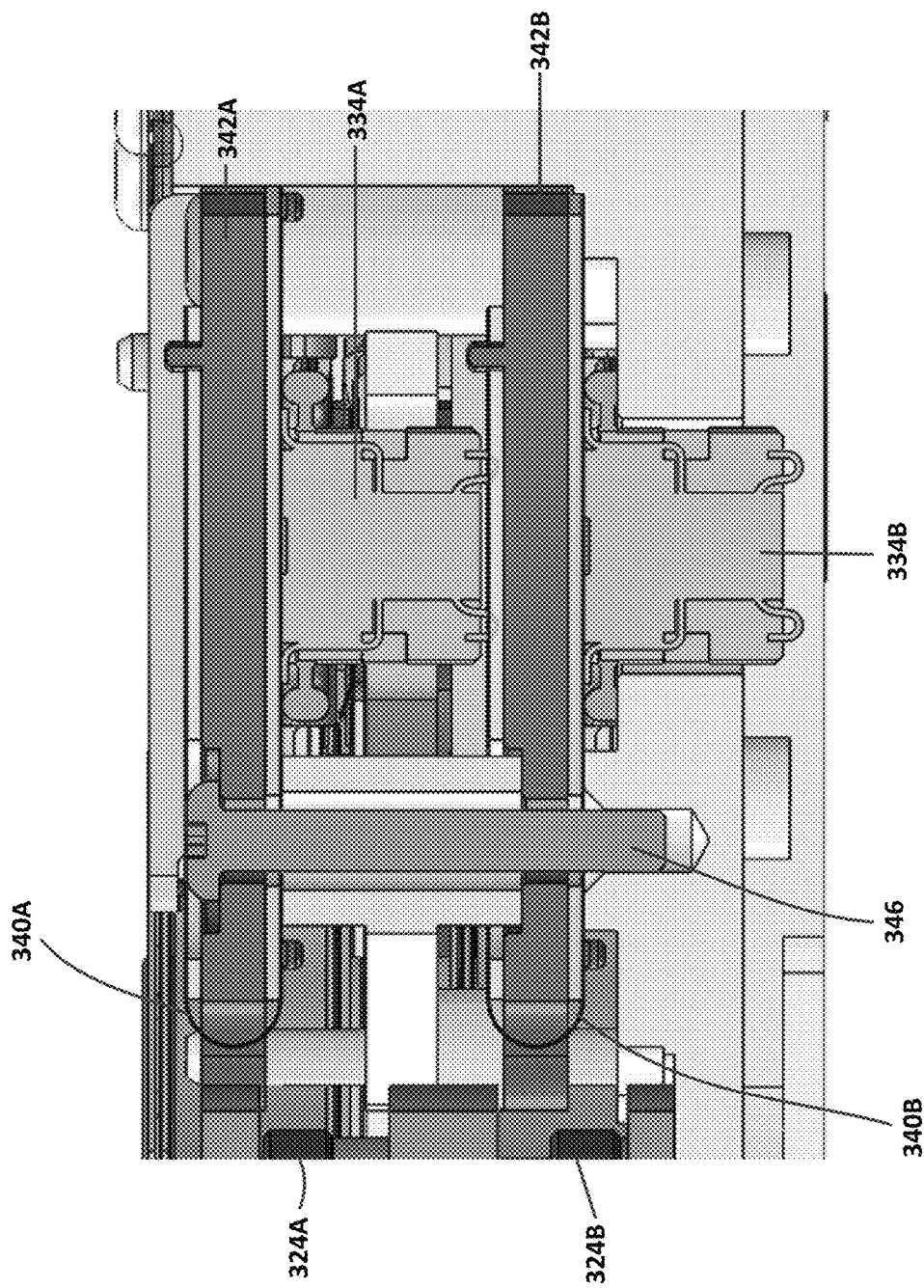
FIG. 18 shows a cut-away side view of a portion of the hard drive of FIG. 15.

As also shown in, e.g., FIG. 17, support members 342A and 342B (also called flex clamps) secure the first and second electrical connectors (334A, 334B) and provide resistance to flexing forces. In particular, a first support member 342A is located above the first electrical connector 334A. A second support member 342B is located below the first electrical connector 334A and above the second electrical connector 334B. These support members are made of a relatively stiff material, such as plastic or the like, in order to resist flexing forces exerted on the connection assemblies. In some embodiments, portions of the support members may also serve to limit compression and maintain separation between components. The support members include apertures 344 that receive securement members 346, such as screws, posts, or the like. The securement members 346 compress the support members 342A, 342B to align and retain the electrical connectors 334A, 334B in place and to maintain electrical connectivity.

Figure 19:
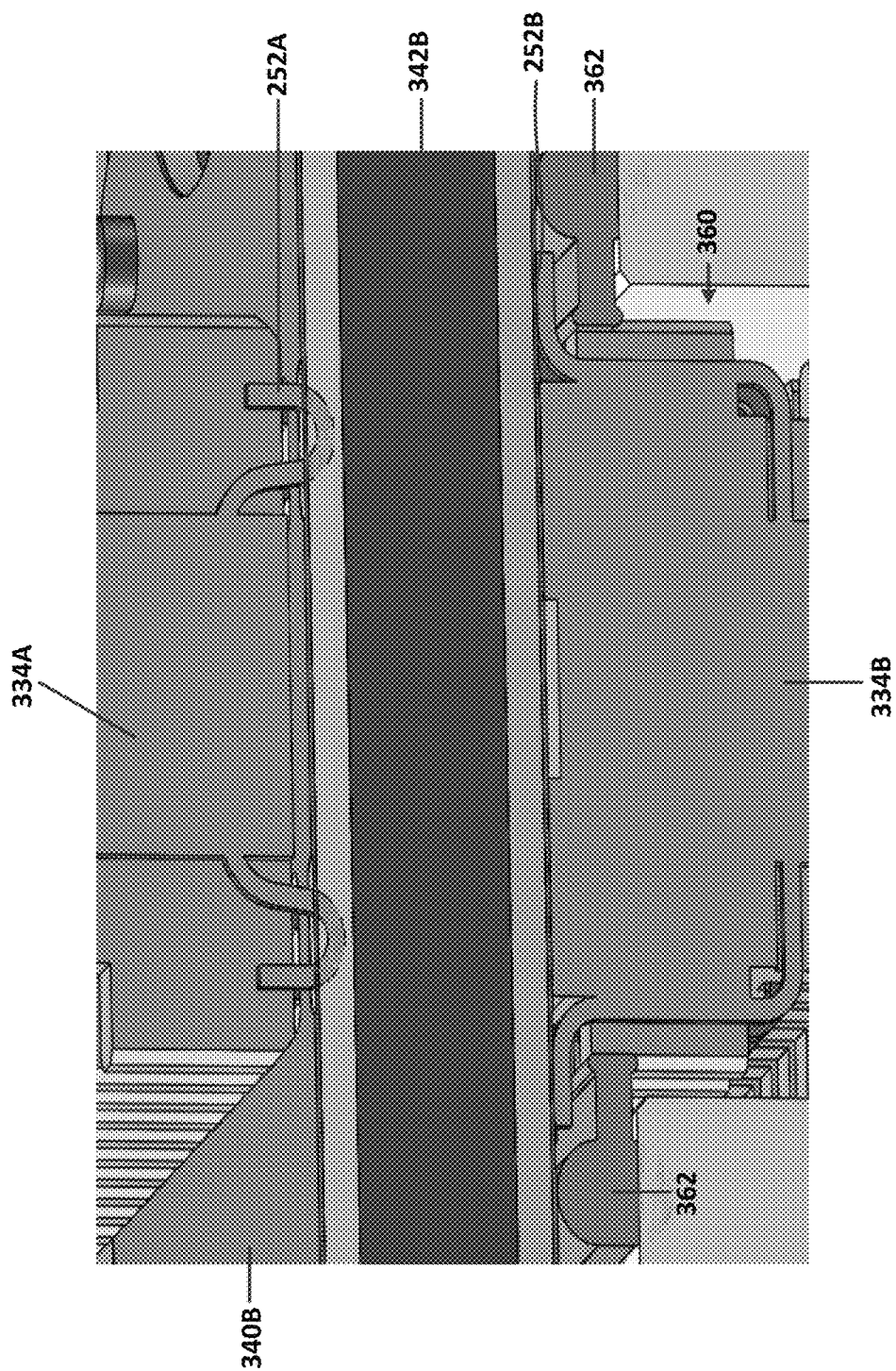
FIG. 19 shows a cut-away perspective view of a first electrical connector and surrounding components, in accordance with certain embodiments of the present disclosure.

In some embodiments, a flex circuit 340B is used to electrically connect the first electrical connector 334A to the second electrical connector 334B. Another flex circuit 340A may also be added. As shown in, e.g., FIG. 17, the flex circuit 340B wraps around the second support member 342B, contacting pins 352A or other electrical conduits on the bottom end of the first electrical connector 334A (as best seen in FIG. 19) and pins 352B or other electrical conduits on the top end of the second electrical connector 334B. In other embodiments, the second support member 342B could be configured with pins or channels to connect the first and second electrical connectors through the middle of the support member rather than using a flex circuit that wraps around the external surface of the second support member.

Figure 20:
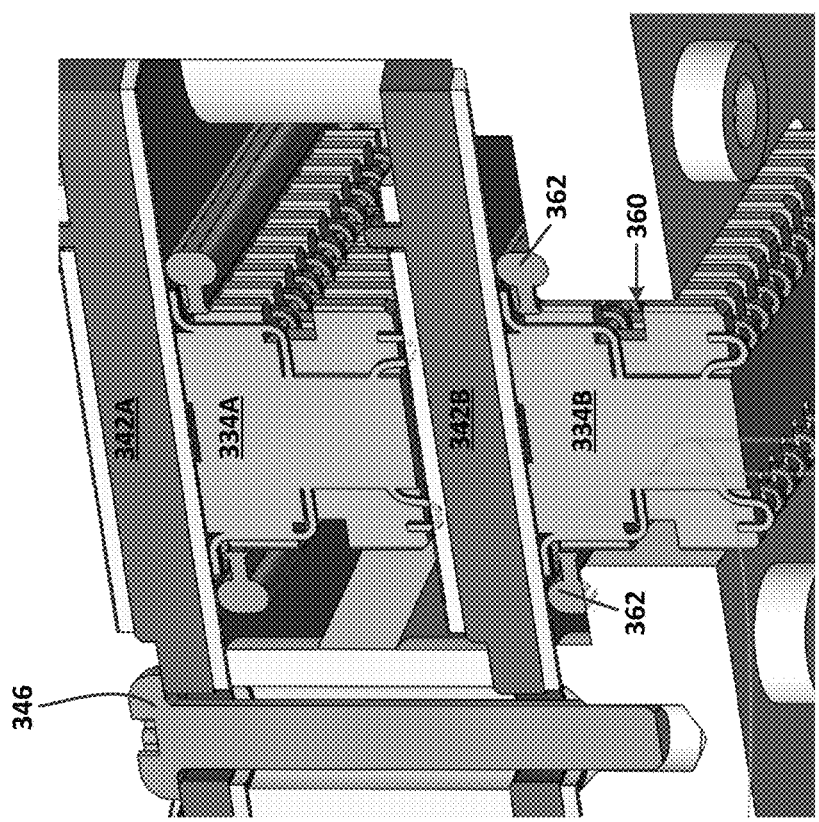
FIG. 20 show a cut-away perspective view showing a first electrical connector, a second electrical connector, and surrounding components in accordance with certain embodiments of the present disclosure.

As best seen in FIG. 20, the second electrical connector 334B communicates signals through a single aperture 360 in the base deck 302. Sealing elements 362 and electrical conduits 364 may be used to hermetically seal the aperture 360 while enabling communications with external components (e.g., control circuitry on a PCB). As discussed above, communicating signals for both VCMAs and actuators through a single aperture reduces the likelihood of leaks and other problems.

In these configurations, the first VCMA 324A is located at a different, higher elevation than the second VCMA 324B. Similarly, the first actuator 312A is located at a different, higher elevation than the second actuator 312B. The first electrical connector 334A is located at a different, higher elevation than the second electrical connector 334B. The first flexible conductive ribbon 332A is located at a different, higher elevation than the second conductive ribbon 332B. In some embodiments, spacing elements (e.g., spacing element 370 in FIG. 17, spacing element 371 in FIG. 17, and/or the support members 342A, 342B) can separate the two VCMAs and/or the two electrical connectors. As discussed below in more detail, these arrangements facilitate easier installation and/or repair. Arranging some or all of these components in this fashion further reduces the footprint required within the base deck. Arranging some or all of these components in this fashion also enables better use of the elevational space within the base deck.

Several of the embodiments discussed herein facilitate easy assembly and repair operations. For example, in some embodiments a hard drive is assembled by placing a lower VCMA and a lower actuator in a base deck. This lower VCMA and lower actuator may be the second VCMA 224B and the second actuator 212B discussed above. A lower electrical connector (e.g., the second electrical connector 234B) and a lower flexible conductive ribbon (e.g., the flexible conductive ribbon 232B) are added to the base deck and placed in electrical communication. As discussed above, this configuration forms a dynamic loop and enables external circuitry to communicate signals with the lower VCMA and the lower actuator through the lower electrical connector. In some embodiments, this step may include adding a lower support member that supports the electrical connector.

With those components in place, an upper dynamic loop can be added to the base deck with an upper VCMA (e.g., the first VCMA 224A), an upper actuator (e.g., the first actuator 212A), an upper flexible connector ribbon (e.g., the flexible conductive ribbon 232A), and an upper connector (e.g., the first electrical connector 234A). This step may also include adding an upper support member (e.g., the first support member 242A) and a flex circuit (flex circuit 240). The two electrical connectors are placed in electrical communication, with the lower electrical connector separately communicating signals for the lower VCMA and lower actuator as well as signals for the other electrical connector (for the upper VCMA and upper actuator). In this manner, two independent dynamic loops are used for independent operations. Securement members can fix the support members in place as well as strengthen the electrical connection between the two electrical connectors.

Should the upper VCMA, the upper actuator, the upper flexible connector ribbon, and/or the upper electrical connector need to be repaired and/or replaced, some or all of those components may be removed from the base deck and/or replaced within the base deck without needing to move or remove the lower VCMA, the lower actuator, the lower flexible connector ribbon, and/or the lower electrical connector. This stackable configuration also allows each VCMA to be constructed in a top-down manner.

As discussed herein, the design in some embodiments is generally smaller than configurations that fit two connectors side-by-side. Size requirements are further reduced as power pins are shared between actuators. Furthermore, in some embodiments each head stack assembly can be fabricated individually using existing assembly methods for single actuator designs, and then configured at drive assembly to be a dual actuator design.

Various modifications and additions can be made to the exemplary embodiments discussed without departing from the scope of the present invention. For example, the various electrical connectors described above can be used with multi-actuator configurations where the actuators do not rotate around a common axis. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A storage device comprising:
   a first actuator and a second actuator rotatable around a common axis;
   a first electrical connector configured to communicate electrical signals to and from the first actuator;
   a second electrical connector configured to communicate electrical signals to and from the second actuator and to communicate electrical signals to and from the first electrical connector;
   a first support member and a second support member, the first and second support members are coupled to and configured to secure the first and second electrical connectors; and
   a spacing member located between the first support member and the second support member.

2. The storage device of claim 1, further comprising a hermetically-sealed body, the hermetically-sealed body including a base deck and a top cover, wherein the second electrical connector is configured to send and receive electrical signals to and from the first actuator and the second actuator through a single aperture in the hermetically-sealed body.

3. The storage device of claim 2, wherein the hermetically-sealed body is filled with an inert gas.

4. The storage device of claim 1, wherein the second electrical connector is configured to communicate electrical signals to and from the first electrical connector via a flex circuit.

5. The storage device of claim 4, wherein the flex circuit is configured to flex around the support member.

6. The storage device of claim 1, wherein the first electrical connector is configured to communicate a first volume of electrical signals and wherein the second electrical connector is configured to communicate a second volume of electrical signals, the second volume being at least twice the first volume.

7. The storage device of claim 1, wherein the second electrical connector is configured to separate electrical signals to and from the second actuator from electrical signals to and from the first electrical connector.

8. A storage device comprising:
   a body;
   a first actuator within the body, the first actuator being rotatable around a first axis;
   a first electrical connector within the body, the first electrical connector being configured to communicate electrical signals to and from the first actuator via a first flex circuit coupled between the first electrical connector and the first actuator;
   a second actuator within the body, the second actuator being rotatable around the first axis; and
   a second electrical connector within the body, the second electrical connector being configured to communicate electrical signals to and from the second actuator via a second flex circuit coupled between the second electrical connector and the second actuator and the first electrical connector via a third flex circuit coupled between the first electrical connector and the second electrical connector.

9. The storage device of claim 8, wherein the second electrical connector is configured to communicate electrical signals to and from the second actuator, the first electrical connector, and circuitry located outside of the body through a single aperture in the body.

10. The storage device of claim 8, wherein the first actuator operates independently of the second actuator.

11. The storage device of claim 8, wherein the first actuator and the first electrical connector are configured to be removed from the body without removing the second actuator.

12. The storage device of claim 8, wherein the first actuator and the first electrical connector are configured to be removed from the body without removing the second electrical connector.

13. The storage device of claim 8, further comprising at least one securement member located adjacent at least the first electrical connector, the at least one securement member being configured to resist compressive forces.

14. The storage device of claim 13, wherein the at least one securement member is further configured to maintain a spacing between the first electrical connector and the second electrical connector.

15. The storage device of claim 8, wherein the first actuator is located at a different elevation than the second actuator and wherein the first electrical connector is located at a different elevation than the second electrical connector.

16. The storage device of claim 8, wherein the first actuator is part of a first dynamic loop, wherein the second actuator is part of a second dynamic loop, and wherein the first dynamic loop is independent of the second dynamic loop.

17. An electrical connector assembly for a hard drive employing at least two actuators, the electrical connector assembly comprising:

a first electrical connector configured to communicate electrical signals to and from a first actuator through a first dynamic loop; and a second electrical connector separate from but in a stacked arrangement with the first electrical connector, the second electrical connector configured to communicate electrical signals to and from a second actuator through a second dynamic loop, the second electrical connector being further configured to communicate electrical signals to and from the first actuator via the first electrical connector and the first dynamic loop.

18. The electrical connector assembly of claim 17, further comprising a support assembly coupled to the first electrical connector and the second electrical connector, the support assembly being configured to secure the first electrical connector and the second connector.

19. The electrical connector assembly of claim 17, wherein the second electrical connector includes more conductive pins for communicating the electrical signals than the first electrical connector.

20. The electrical connector assembly of claim 17, wherein the second electrical connector has a larger footprint than the first electrical connector.

* * * * *